(12) United States Patent
Yang et al.

(10) Patent No.: US 12,363,705 B2
(45) Date of Patent: *Jul. 15, 2025

(54) CANCELLATION AND REPLACEMENT OF PUSCH

(71) Applicant: Apple Inc., Cupertino, CA (US)

(72) Inventors: Weidong Yang, San Diego, CA (US);
Ruoheng Liu, San Diego, CA (US);
Amir Aminzadeh Gohari, Sunnyvale, CA (US); Narayan Vishwanathan, San Diego, CA (US); Sigen Ye, Whitehouse Station, NJ (US); Chunxuan Ye, San Diego, CA (US); Wei Zeng, San Diego, CA (US); Dawei Zhang, Saratoga, CA (US); Oghenekome Oteri, San Diego, CA (US)

(73) Assignee: Apple Inc., Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/487,691

(22) Filed: Oct. 16, 2023

(65) Prior Publication Data

US 2024/0049223 A1 Feb. 8, 2024

Related U.S. Application Data

(63) Continuation of application No. 17/396,161, filed on Aug. 6, 2021, now Pat. No. 11,825,469.
(Continued)

(51) Int. Cl.
*H04W 72/12* (2023.01)
*H04W 72/1268* (2023.01)
(Continued)

(52) U.S. Cl.
CPC ....... *H04W 72/1268* (2013.01); *H04W 72/23* (2023.01); *H04W 72/566* (2023.01)

(58) Field of Classification Search
None
See application file for complete search history.

(56) References Cited

U.S. PATENT DOCUMENTS

| 2019/0327755 | A1* | 10/2019 | Xiong | H04L 5/0046 |
| 2020/0389280 | A1* | 12/2020 | Li | H04L 1/1896 |

(Continued)

FOREIGN PATENT DOCUMENTS

| WO | WO-2020069359 A1 * | 4/2020 | ........... H04L 1/1887 |
| WO | WO-2021231507 A1 * | 11/2021 | ............... H04L 1/08 |

OTHER PUBLICATIONS

International Search Report for PCT Application No. PCT/US2021/045116; Nov. 25, 2021.
(Continued)

*Primary Examiner* — Kodzovi Acolatse
(74) *Attorney, Agent, or Firm* — Kowert, Hood, Munyon, Rankin & Goetzel, P.C.

(57) ABSTRACT

Apparatuses, systems, and methods for cancellation and/or replacement of PUSCHs. A user equipment device (UE) may configure a first PUSCH and a second PUSCH, where the first PUSCH may correspond to a configured grant and where the second PUSCH may correspond to a configured grant or scheduled by a PDCCH on a serving cell. The UE may determine that at least one transmission occasion associated with the first PUSCH overlaps in time with at least one transmission occasion associated with the second PUSCH. The UE may drop transmissions scheduled for the second PUSCH, e.g., based on determining that a priority of the first PUSCH is higher than a priority of the second PUSCH, e.g., starting with a first symbol of a repetition of the second PUSCH which overlaps in time with one or more repetitions of the first PUSCH.

20 Claims, 22 Drawing Sheets

Related U.S. Application Data

(60) Provisional application No. 63/062,146, filed on Aug. 6, 2020.

(51) Int. Cl.
*H04W 72/23* (2023.01)
*H04W 72/566* (2023.01)

(56) References Cited

U.S. PATENT DOCUMENTS

2021/0021385 A1\* 1/2021 Chen ................ H04L 5/0053
2023/0189255 A1\* 6/2023 Bagheri ............. H04L 1/1812
370/329

OTHER PUBLICATIONS

Moderator (vivo) "Email discussion #01 for enhanced configured grant transmission"; 3GPP TSG RAN WG1 #101 R1-2005052; May 25, 2020.
Sony "Considerations on UL Intra-UE Tx Multiplexing"; 3GPP TSG RAN WG1 #96 R1-1902182; Feb. 25, 2019.
Moderator (vivo) "Summary of enhanced UL configured grant transmission"; 3GPP TSG RAN WG1 #101 R1-2003395; May 25, 2020.

\* cited by examiner

| Configured Grant PUSCH | | | |
|---|---|---|---|
| Single slot PUSCH | PUSCH with aggregation/PUSCH repetition type A | | PUSCH repetition type B |
| | | | |
| Single slot PUSCH | Follow 3GPP release 15 timing requirements; PUSCH repetition type A follows PUSCH with aggregation treatment | | Follow 3GPP release 15 timing requirements; DG PUSCH overrides any CG PUSCH repetition |
| PUSCH with aggregation/PUSCH repetition type A | | If no overlap, both are allowed; if overlap dynamic grant overrides | Follow 3GPP release 15 timing requirements; DG PUSCH overrides any CG PUSCH repetition |
| PUSCH repetition type B | If no overlap, both are allowed; if overlap dynamic grant overrides | If no overlap, both are allowed; if overlap dynamic grant overrides | If no overlap, both are allowed; if overlap dynamic grant overrides |
| Dynamic Grant PUSCH | | | |

FIG. 13

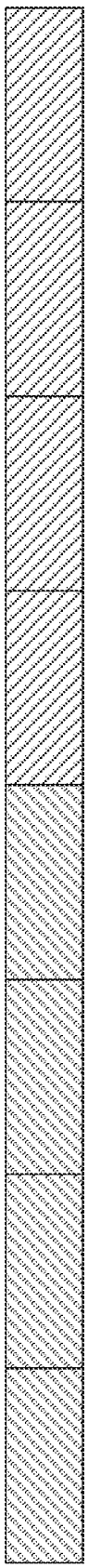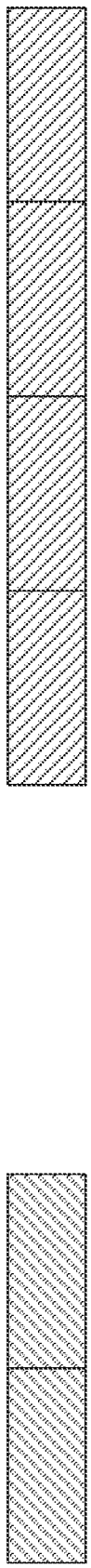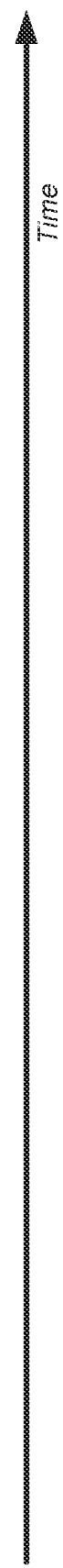
FIG. 14

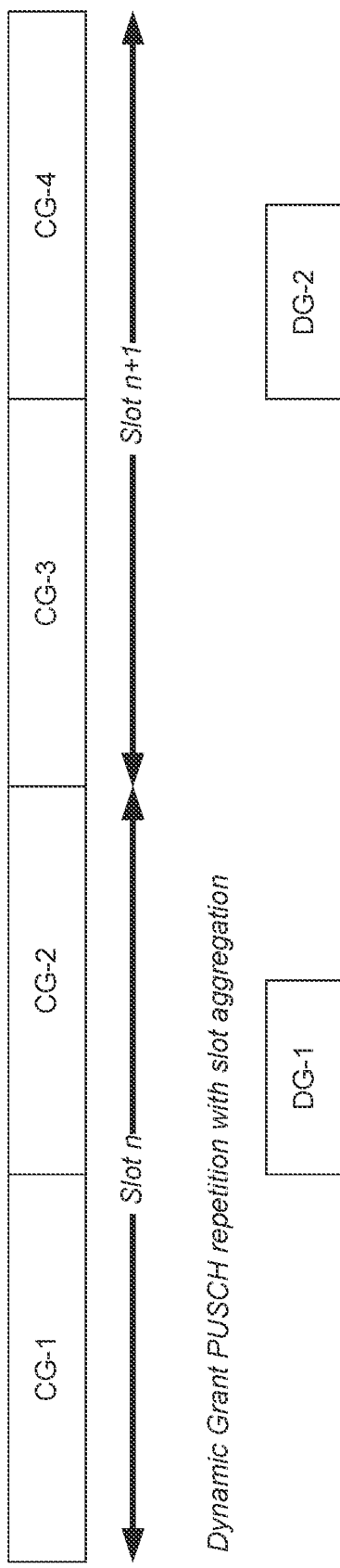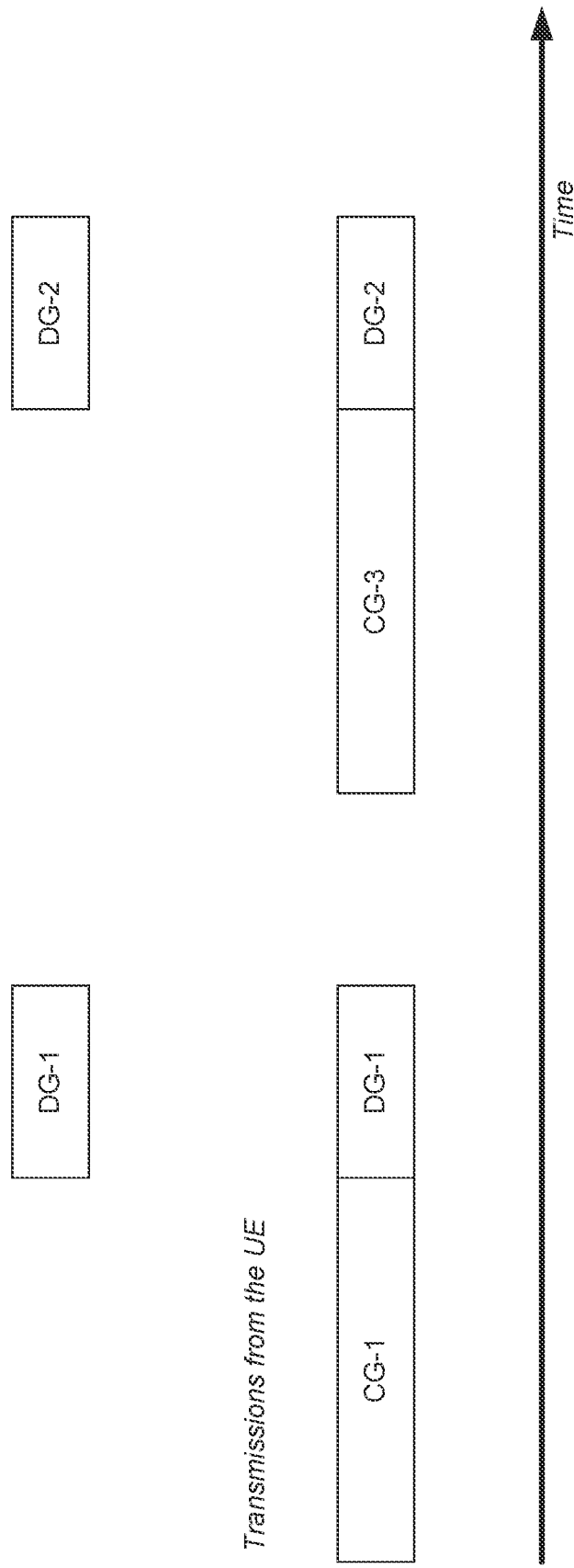
FIG. 15

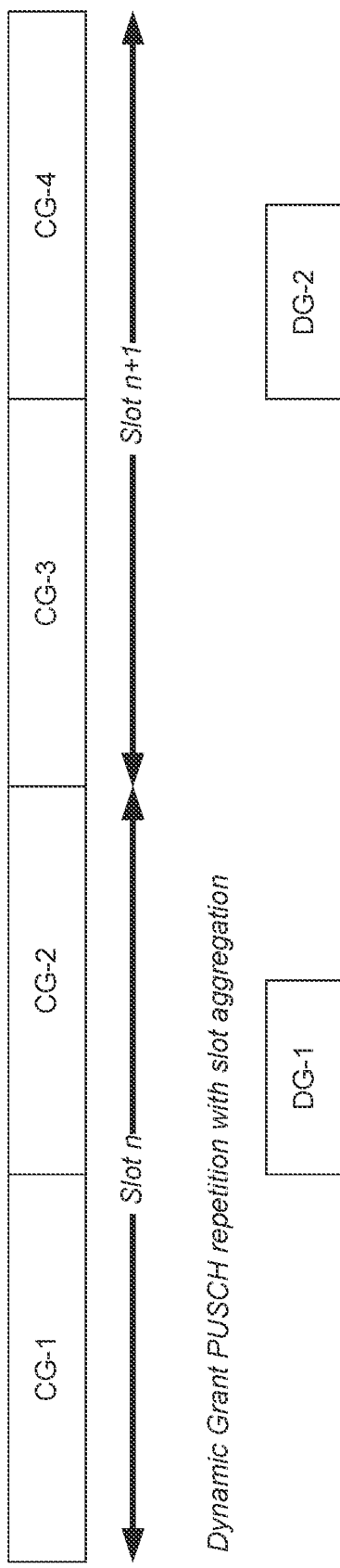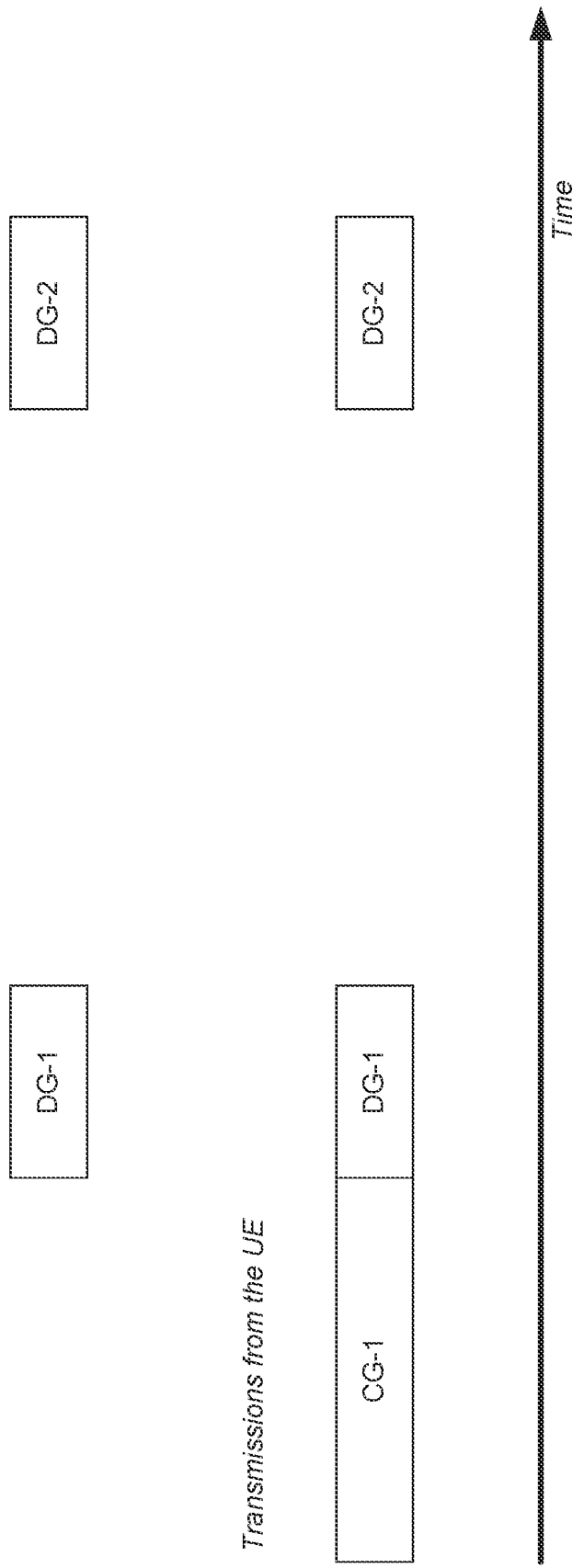
FIG. 16

CANCELLATION AND REPLACEMENT OF PUSCH

PRIORITY DATA

This application is a continuation of U.S. application Ser. No. 17/396,161 titled "Cancellation and Replacement of PUSCH", filed Aug. 6, 2021, which claims benefit of priority to U.S. Provisional Application Ser. No. 63/062,146, titled "Cancellation and Replacement of PUSCH", filed Aug. 6, 2020, which is hereby incorporated by reference in its entirety as though fully and completely set forth herein.

The claims in the instant application are different than those of the parent application and/or other related applications. The Applicant therefore rescinds any disclaimer of claim scope made in the parent application and/or any predecessor application in relation to the instant application. Any such previous disclaimer and the cited references that it was made to avoid, may need to be revisited. Further, any disclaimer made in the instant application should not be read into or against the parent application and/or other related applications.

FIELD

The invention relates to wireless communications, and more particularly to apparatuses, systems, and methods for cancellation and/or replacement of physical uplink shared channels (PUSCHs) with differing priorities, e.g., for ultra-reliable low-latency communication (URLLC) and/or enhanced URLLC (eURLLC).

DESCRIPTION OF THE RELATED ART

Wireless communication systems are rapidly growing in usage. In recent years, wireless devices such as smart phones and tablet computers have become increasingly sophisticated. In addition to supporting telephone calls, many mobile devices now provide access to the internet, email, text messaging, and navigation using the global positioning system (GPS), and are capable of operating sophisticated applications that utilize these functionalities.

Long Term Evolution (LTE) has become the technology of choice for the majority of wireless network operators worldwide, providing mobile broadband data and high-speed Internet access to their subscriber base. LTE defines a number of downlink (DL) physical channels, categorized as transport or control channels, to carry information blocks received from medium access control (MAC) and higher layers. LTE also defines a number of physical layer channels for the uplink (UL).

For example, LTE defines a Physical Downlink Shared Channel (PDSCH) as a DL transport channel. The PDSCH is the main data-bearing channel allocated to users on a dynamic and opportunistic basis. The PDSCH carries data in Transport Blocks (TB) corresponding to a MAC protocol data unit (PDU), passed from the MAC layer to the physical (PHY) layer once per Transmission Time Interval (TTI). The PDSCH is also used to transmit broadcast information such as System Information Blocks (SIB) and paging messages.

As another example, LTE defines a Physical Downlink Control Channel (PDCCH) as a DL control channel that carries the resource assignment for UEs that are contained in a Downlink Control Information (DCI) message. Multiple PDCCHs can be transmitted in the same subframe using Control Channel Elements (CCE), each of which is a nine set of four resource elements known as Resource Element Groups (REG). The PDCCH employs quadrature phase-shift keying (QPSK) modulation, with four QPSK symbols mapped to each REG. Furthermore, 1, 2, 4, or 8 CCEs can be used for a UE, depending on channel conditions, to ensure sufficient robustness.

Additionally, LTE defines a Physical Uplink Shared Channel (PUSCH) as a UL channel shared by all devices (user equipment, UE) in a radio cell to transmit user data to the network. The scheduling for all UEs is under control of the LTE base station (enhanced Node B, or eNB). The eNB uses the uplink scheduling grant (DCI format 0) to inform the UE about resource block (RB) assignment, and the modulation and coding scheme to be used. PUSCH typically supports QPSK and quadrature amplitude modulation (QAM). In addition to user data, the PUSCH also carries any control information necessary to decode the information, such as transport format indicators and multiple-in multiple-out (MIMO) parameters. Control data is multiplexed with information data prior to digital Fourier transform (DFT) spreading.

A proposed next telecommunications standard moving beyond the current International Mobile Telecommunications-Advanced (IMT-Advanced) Standards is called 5th generation mobile networks or 5th generation wireless systems, or 5G for short (otherwise known as 5G-NR for 5G New Radio, also simply referred to as NR). 5G-NR may provide a higher capacity for a higher density of mobile broadband users, also supporting device-to-device, ultra-reliable, and massive machine type communications with lower latency and/or lower battery consumption. Further, the 5G-NR may allow for more flexible UE scheduling as compared to current LTE. Consequently, efforts are being made in ongoing developments of 5G-NR to take advantage of higher throughputs possible at higher frequencies.

SUMMARY

Embodiments relate to wireless communications, and more particularly to apparatuses, systems, and methods for cancellation and/or replacement of physical uplink shared channels (PUSCHs) with differing priorities, e.g., for ultra-reliable low-latency communication (URLLC) and/or enhanced URLLC (eURLLC).

For example, a user equipment device (UE) may be configured to configure a first PUSCH and a second PUSCH, e.g., the UE may determine resources for transmission on the first PUSCH and the second PUSCH. The first PUSCH may correspond to a configured grant. The second PUSCH may correspond to a configured grant or may be scheduled by a physical downlink control channel (PDCCH) on a serving cell. Thus, the UE may configure the first PUSCH (e.g., determine resources for transmission on the first PUSCH) based on the configured grant. Similarly, the UE may configure the second PUSCH (e.g., determine resources for transmission on the second PUSCH) based on the schedule provided by the PDCCH on the serving cell (e.g., a dynamic grant) and/or another configured grant. In other words, the UE may prepare transmission of first data on a first PUSCH resource based on the configured grant. Similarly, the UE may prepare transmission of second data on a second PUSCH resource based on the schedule provided by the PDCCH on the serving cell and/or another configured grant. Additionally, the UE may be configured to determine that at least one transmission occasion associated with the first PUSCH overlaps in time with at least one transmission occasion associated with the second PUSCH. Further, the UE may be configured to drop (e.g., based, at least in part, on a priority of the first PUSCH) transmissions (e.g., one or more transmissions) scheduled for the second PUSCH. For example, the UE may drop transmissions scheduled for the second PUSCH based, at least in part, on determining that the priority of the first PUSCH is higher than a priority of the second PUSCH. T transmissions scheduled for the second PUSCH may be dropped starting with a first symbol of a repetition of the second PUSCH which overlaps in time with one or more repetitions of the first PUSCH.

The techniques described herein may be implemented in and/or used with a number of different types of devices, including but not limited to unmanned aerial vehicles (UAVs), unmanned aerial controllers (UACs), a UTM server, base stations, access points, cellular phones, tablet computers, wearable computing devices, portable media players, and any of various other computing devices.

This Summary is intended to provide a brief overview of some of the subject matter described in this document. Accordingly, it will be appreciated that the above-described features are merely examples and should not be construed to narrow the scope or spirit of the subject matter described herein in any way. Other features, aspects, and advantages of the subject matter described herein will become apparent from the following Detailed Description, Figures, and Claims.

BRIEF DESCRIPTION OF THE DRAWINGS

A better understanding of the present subject matter can be obtained when the following detailed description of various embodiments is considered in conjunction with the following drawings, in which:

FIG. 13 illustrates examples of possible treatments of colliding transmissions, according to some embodiments.

FIGS. 14-16 illustrate examples of interleaving of a dynamic grant and a configured grant, according to some embodiments.

Figure 1A:
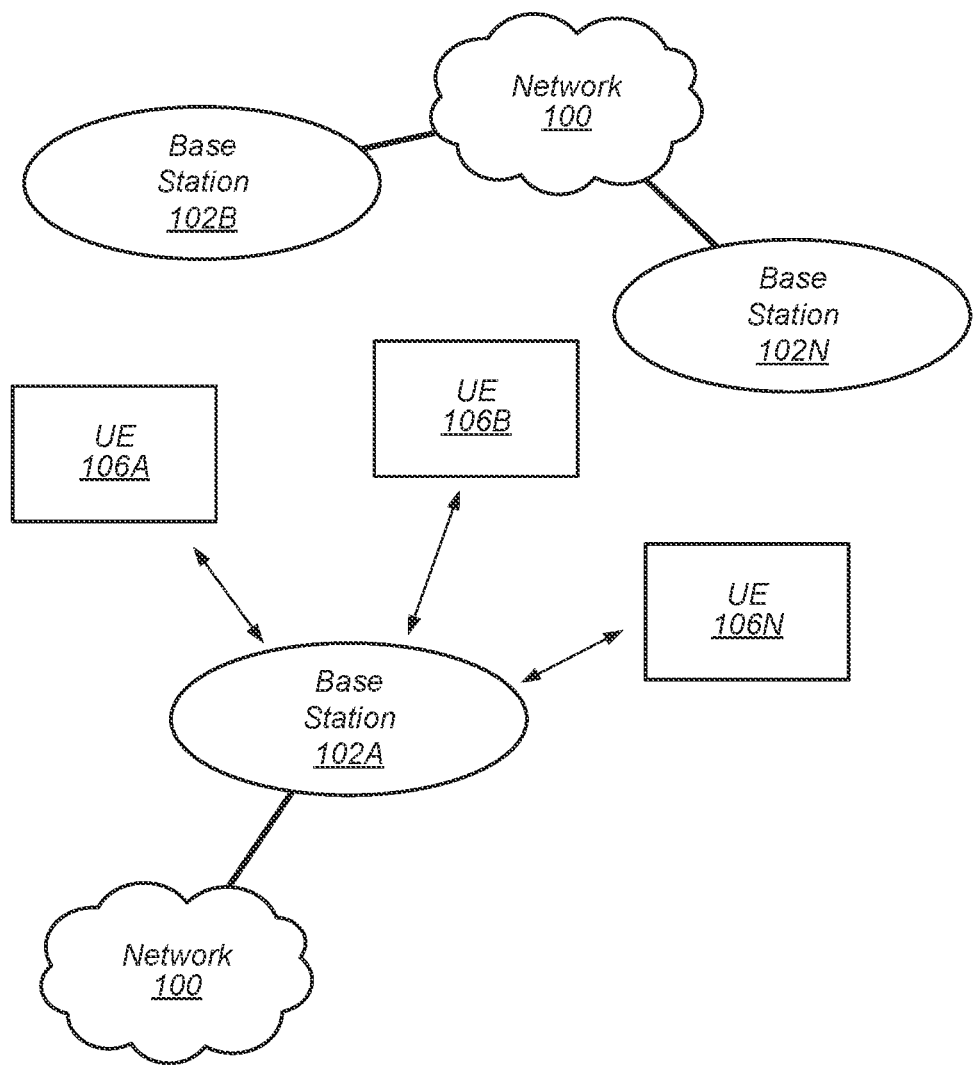
FIG. 1A illustrates an example wireless communication system according to some embodiments.

While the features described herein may be susceptible to various modifications and alternative forms, specific embodiments thereof are shown by way of example in the drawings and are herein described in detail. It should be understood, however, that the drawings and detailed description thereto are not intended to be limiting to the particular form disclosed, but on the contrary, the intention is to cover all modifications, equivalents and alternatives falling within the spirit and scope of the subject matter as defined by the appended claims.

DETAILED DESCRIPTION

Acronyms

Various acronyms are used throughout the present disclosure. Definitions of the most prominently used acronyms that may appear throughout the present disclosure are provided below:

3GPP: Third Generation Partnership Project
UE: User Equipment
RF: Radio Frequency
BS: Base Station
DL: Downlink
UL: Uplink
LTE: Long Term Evolution
NR: New Radio
5GS: 5G System
5GMM: 5GS Mobility Management
5GC/5GCN: 5G Core Network
IE: Information Element
CE: Control Element
MAC: Medium Access Control
SSB: Synchronization Signal Block
CSI-RS: Channel State Information Reference Signal
PDCCH: Physical Downlink Control Channel
PDSCH: Physical Downlink Shared Channel
RRC: Radio Resource Control
RRM: Radio Resource Management
CORESET: Control Resource Set
TCI: Transmission Configuration Indicator
DCI: Downlink Control Indicator Terms The following is a glossary of terms used in this disclosure:

Memory Medium—Any of various types of non-transitory memory devices or storage devices. The term "memory medium" is intended to include an installation medium, e.g., a CD-ROM, floppy disks, or tape device; a computer system memory or random access memory such as DRAM, DDR RAM, SRAM, EDO RAM, Rambus RAM, etc.; a non-volatile memory such as a Flash, magnetic media, e.g., a hard drive, or optical storage; registers, or other similar types of memory elements, etc. The memory medium may include other types of non-transitory memory as well or combinations thereof. In addition, the memory medium may be located in a first computer system in which the programs are executed, or may be located in a second different computer system which connects to the first computer system over a network, such as the Internet. In the latter instance, the second computer system may provide program instructions to the first computer for execution. The term "memory medium" may include two or more memory mediums which may reside in different locations, e.g., in different computer systems that are connected over a network. The memory medium may store program instructions (e.g., embodied as computer programs) that may be executed by one or more processors.

Carrier Medium—a memory medium as described above, as well as a physical transmission medium, such as a bus, network, and/or other physical transmission medium that conveys signals such as electrical, electromagnetic, or digital signals.

Programmable Hardware Element—includes various hardware devices comprising multiple programmable function blocks connected via a programmable interconnect. Examples include FPGAs (Field Programmable Gate Arrays), PLDs (Programmable Logic Devices), FPOAs (Field Programmable Object Arrays), and CPLDs (Complex PLDs). The programmable function blocks may range from fine grained (combinatorial logic or look up tables) to coarse grained (arithmetic logic units or processor cores). A programmable hardware element may also be referred to as "reconfigurable logic".

Computer System (or Computer)—any of various types of computing or processing systems, including a personal computer system (PC), mainframe computer system, workstation, network appliance, Internet appliance, personal digital assistant (PDA), television system, grid computing system, or other device or combinations of devices. In general, the term "computer system" can be broadly defined to encompass any device (or combination of devices) having at least one processor that executes instructions from a memory medium.

User Equipment (UE) (or "UE Device")—any of various types of computer systems devices which are mobile or portable and which performs wireless communications. Examples of UE devices include mobile telephones or smart phones (e.g., iPhone™, Android™-based phones), portable gaming devices (e.g., Nintendo DS™, PlayStation Portable™, Gameboy Advance™, iPhone™), laptops, wearable devices (e.g. smart watch, smart glasses), PDAs, portable Internet devices, music players, data storage devices, other handheld devices, unmanned aerial vehicles (UAVs) (e.g., drones), UAV controllers (UACs), and so forth. In general, the term "UE" or "UE device" can be broadly defined to encompass any electronic, computing, and/or telecommunications device (or combination of devices) which is easily transported by a user and capable of wireless communication.

Base Station—The term "Base Station" has the full breadth of its ordinary meaning, and at least includes a wireless communication station installed at a fixed location and used to communicate as part of a wireless telephone system or radio system.

Processing Element (or Processor)—refers to various elements or combinations of elements that are capable of performing a function in a device, such as a user equipment or a cellular network device. Processing elements may include, for example: processors and associated memory, portions or circuits of individual processor cores, entire processor cores, processor arrays, circuits such as an ASIC (Application Specific Integrated Circuit), programmable hardware elements such as a field programmable gate array (FPGA), as well any of various combinations of the above.

Channel—a medium used to convey information from a sender (transmitter) to a receiver. It should be noted that since characteristics of the term "channel" may differ according to different wireless protocols, the term "channel" as used herein may be considered as being used in a manner that is consistent with the standard of the type of device with reference to which the term is used. In some standards, channel widths may be variable (e.g., depending on device capability, band conditions, etc.). For example, LTE may support scalable channel bandwidths from 1.4 MHz to 20 MHz. In contrast, WLAN channels may be 22 MHz wide while Bluetooth channels may be 1 Mhz wide. Other protocols and standards may include different definitions of channels. Furthermore, some standards may define and use multiple types of channels, e.g., different channels for uplink or downlink and/or different channels for different uses such as data, control information, etc.

Band—The term "band" has the full breadth of its ordinary meaning, and at least includes a section of spectrum (e.g., radio frequency spectrum) in which channels are used or set aside for the same purpose.

Wi-Fi—The term "Wi-Fi" (or WiFi) has the full breadth of its ordinary meaning, and at least includes a wireless communication network or RAT that is serviced by wireless LAN (WLAN) access points and which provides connectivity through these access points to the Internet. Most modern Wi-Fi networks (or WLAN networks) are based on IEEE 802.11 standards and are marketed under the name "Wi-Fi". A Wi-Fi (WLAN) network is different from a cellular network.

3GPP Access—refers to accesses (e.g., radio access technologies) that are specified by 3GPP standards. These accesses include, but are not limited to, GSM/GPRS, LTE, LTE-A, and/or 5G NR. In general, 3GPP access refers to various types of cellular access technologies.

Non-3GPP Access—refers any accesses (e.g., radio access technologies) that are not specified by 3GPP standards. These accesses include, but are not limited to, WiMAX, CDMA2000, Wi-Fi, WLAN, and/or fixed networks. Non-3GPP accesses may be split into two categories, "trusted" and "untrusted": Trusted non-3GPP accesses can interact directly with an evolved packet core (EPC) and/or a 5G core (5GC) whereas untrusted non-3GPP accesses interwork with the EPC/5GC via a network entity, such as an Evolved Packet Data Gateway and/or a 5G NR gateway. In general, non-3GPP access refers to various types on non-cellular access technologies.

Automatically—refers to an action or operation performed by a computer system (e.g., software executed by the computer system) or device (e.g., circuitry, programmable hardware elements, ASICs, etc.), without user input directly specifying or performing the action or operation. Thus, the term "automatically" is in contrast to an operation being manually performed or specified by the user, where the user provides input to directly perform the operation. An automatic procedure may be initiated by input provided by the user, but the subsequent actions that are performed "automatically" are not specified by the user, i.e., are not performed "manually", where the user specifies each action to perform. For example, a user filling out an electronic form by selecting each field and providing input specifying information (e.g., by typing information, selecting check boxes, radio selections, etc.) is filling out the form manually, even though the computer system must update the form in response to the user actions. The form may be automatically filled out by the computer system where the computer system (e.g., software executing on the computer system) analyzes the fields of the form and fills in the form without any user input specifying the answers to the fields. As indicated above, the user may invoke the automatic filling of the form, but is not involved in the actual filling of the form (e.g., the user is not manually specifying answers to fields but rather they are being automatically completed). The present specification provides various examples of operations being automatically performed in response to actions the user has taken.

Approximately—refers to a value that is almost correct or exact. For example, approximately may refer to a value that is within 1 to 10 percent of the exact (or desired) value. It should be noted, however, that the actual threshold value (or tolerance) may be application dependent. For example, in some embodiments, "approximately" may mean within 0.1% of some specified or desired value, while in various other embodiments, the threshold may be, for example, 2%, 3%, 5%, and so forth, as desired or as required by the particular application.

Concurrent—refers to parallel execution or performance, where tasks, processes, or programs are performed in an at least partially overlapping manner. For example, concurrency may be implemented using "strong" or strict parallelism, where tasks are performed (at least partially) in parallel on respective computational elements, or using "weak parallelism", where the tasks are performed in an interleaved manner, e.g., by time multiplexing of execution threads.

Various components may be described as "configured to" perform a task or tasks. In such contexts, "configured to" is a broad recitation generally meaning "having structure that" performs the task or tasks during operation. As such, the component can be configured to perform the task even when the component is not currently performing that task (e.g., a set of electrical conductors may be configured to electrically connect a module to another module, even when the two modules are not connected). In some contexts, "configured to" may be a broad recitation of structure generally meaning "having circuitry that" performs the task or tasks during operation. As such, the component can be configured to perform the task even when the component is not currently on. In general, the circuitry that forms the structure corresponding to "configured to" may include hardware circuits.

Various components may be described as performing a task or tasks, for convenience in the description. Such descriptions should be interpreted as including the phrase "configured to." Reciting a component that is configured to perform one or more tasks is expressly intended not to invoke 35 U.S.C. § 112(f) interpretation for that component.

Figure 1B:
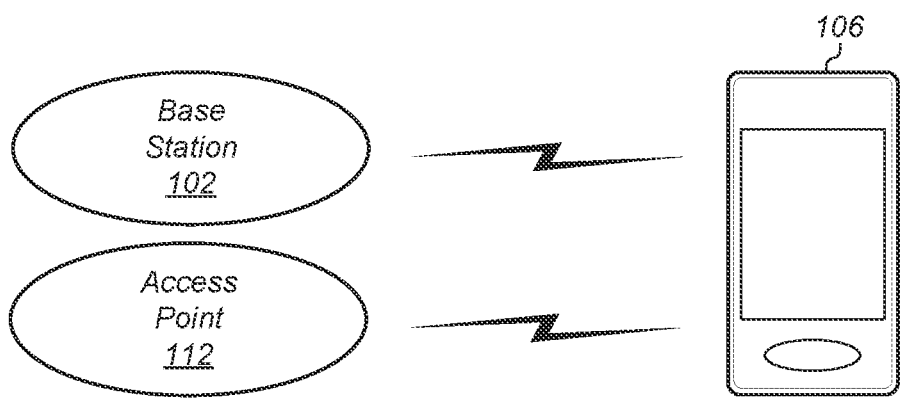
FIG. 1B illustrates an example of a base station (BS) and an access point in communication with a user equipment (UE) device according to some embodiments.

FIGS. 1A and 1B: Communication Systems

FIG. 1A illustrates a simplified example wireless communication system, according to some embodiments. It is noted that the system of FIG. 1A is merely one example of a possible system, and that features of this disclosure may be implemented in any of various systems, as desired.

As shown, the example wireless communication system includes a base station 102A which communicates over a transmission medium with one or more user devices 106A, 106B, etc., through 106N. Each of the user devices may be referred to herein as a "user equipment" (UE). Thus, the user devices 106 are referred to as UEs or UE devices.

The base station (BS) 102A may be a base transceiver station (BTS) or cell site (a "cellular base station") and may include hardware that enables wireless communication with the UEs 106A through 106N.

The communication area (or coverage area) of the base station may be referred to as a "cell." The base station 102A and the UEs 106 may be configured to communicate over the transmission medium using any of various radio access technologies (RATs), also referred to as wireless communication technologies, or telecommunication standards, such as GSM, UMTS (associated with, for example, WCDMA or TD-SCDMA air interfaces), LTE, LTE-Advanced (LTE-A), 5G new radio (5G NR), HSPA, 3GPP2 CDMA2000 (e.g., 1×RTT, 1×EV-DO, HRPD, eHRPD), etc. Note that if the base station 102A is implemented in the context of LTE, it may alternately be referred to as an 'eNodeB' or 'eNB'. Note that if the base station 102A is implemented in the context of 5G NR, it may alternately be referred to as 'gNodeB' or 'gNB'.

As shown, the base station 102A may also be equipped to communicate with a network 100 (e.g., a core network of a cellular service provider, a telecommunication network such as a public switched telephone network (PSTN), and/or the Internet, among various possibilities). Thus, the base station 102A may facilitate communication between the user devices and/or between the user devices and the network 100. In particular, the cellular base station 102A may provide UEs 106 with various telecommunication capabilities, such as voice, SMS and/or data services.

Base station 102A and other similar base stations (such as base stations 102B . . . 102N) operating according to the same or a different cellular communication standard may thus be provided as a network of cells, which may provide continuous or nearly continuous overlapping service to UEs 106A-N and similar devices over a geographic area via one or more cellular communication standards.

Thus, while base station 102A may act as a "serving cell" for UEs 106A-N as illustrated in FIG. 1, each UE 106 may also be capable of receiving signals from (and possibly within communication range of) one or more other cells (which might be provided by base stations 102B-N and/or any other base stations), which may be referred to as "neighboring cells". Such cells may also be capable of facilitating communication between user devices and/or between user devices and the network 100. Such cells may include "macro" cells, "micro" cells, "pico" cells, and/or cells which provide any of various other granularities of service area size. For example, base stations 102A-B illustrated in FIG. 1 might be macro cells, while base station 102N might be a micro cell. Other configurations are also possible.

In some embodiments, base station 102A may be a next generation base station, e.g., a 5G New Radio (5G NR) base station, or "gNB". In some embodiments, a gNB may be connected to a legacy evolved packet core (EPC) network and/or to a NR core (NRC) network. In addition, a gNB cell may include one or more transition and reception points (TRPs). In addition, a UE capable of operating according to 5G NR may be connected to one or more TRPs within one or more gNBs.

Note that a UE 106 may be capable of communicating using multiple wireless communication standards. For example, the UE 106 may be configured to communicate using a wireless networking (e.g., Wi-Fi) and/or peer-to-peer wireless communication protocol (e.g., Bluetooth, Wi-Fi peer-to-peer, etc.) in addition to at least one cellular communication protocol (e.g., GSM, UMTS (associated with, for example, WCDMA or TD-SCDMA air interfaces), LTE, LTE-A, 5G NR, HSPA, 3GPP2 CDMA2000 (e.g., 1×RTT, 1×EV-DO, HRPD, eHRPD), etc.). The UE 106 may also or alternatively be configured to communicate using one or more global navigational satellite systems (GNSS, e.g., GPS or GLONASS), one or more mobile television broadcasting standards (e.g., ATSC-M/H or DVB-H), and/or any other wireless communication protocol, if desired. Other combinations of wireless communication standards (including more than two wireless communication standards) are also possible.

FIG. 1B illustrates user equipment 106 (e.g., one of the devices 106A through 106N) in communication with a base station 102 and an access point 112, according to some embodiments. The UE 106 may be a device with both cellular communication capability and non-cellular communication capability (e.g., Bluetooth, Wi-Fi, and so forth) such as a mobile phone, a hand-held device, a computer or a tablet, or virtually any type of wireless device.

The UE 106 may include a processor that is configured to execute program instructions stored in memory. The UE 106 may perform any of the method embodiments described herein by executing such stored instructions. Alternatively, or in addition, the UE 106 may include a programmable hardware element such as an FPGA (field-programmable gate array) that is configured to perform any of the method embodiments described herein, or any portion of any of the method embodiments described herein.

The UE 106 may include one or more antennas for communicating using one or more wireless communication protocols or technologies. In some embodiments, the UE 106 may be configured to communicate using, for example, CDMA2000 (1×RTT/1×EV-DO/HRPD/eHRPD), LTE/LTE-Advanced, or 5G NR using a single shared radio and/or GSM, LTE, LTE-Advanced, or 5G NR using the single shared radio. The shared radio may couple to a single antenna, or may couple to multiple antennas (e.g., for MIMO) for performing wireless communications. In general, a radio may include any combination of a baseband processor, analog RF signal processing circuitry (e.g., including filters, mixers, oscillators, amplifiers, etc.), or digital processing circuitry (e.g., for digital modulation as well as other digital processing). Similarly, the radio may implement one or more receive and transmit chains using the aforementioned hardware. For example, the UE 106 may share one or more parts of a receive and/or transmit chain between multiple wireless communication technologies, such as those discussed above.

In some embodiments, the UE 106 may include separate transmit and/or receive chains (e.g., including separate antennas and other radio components) for each wireless communication protocol with which it is configured to communicate. As a further possibility, the UE 106 may include one or more radios which are shared between multiple wireless communication protocols, and one or more radios which are used exclusively by a single wireless communication protocol. For example, the UE 106 might include a shared radio for communicating using either of LTE or 5G NR (or LTE or 1×RTT or LTE or GSM), and separate radios for communicating using each of Wi-Fi and Bluetooth. Other configurations are also possible.

Figure 2:
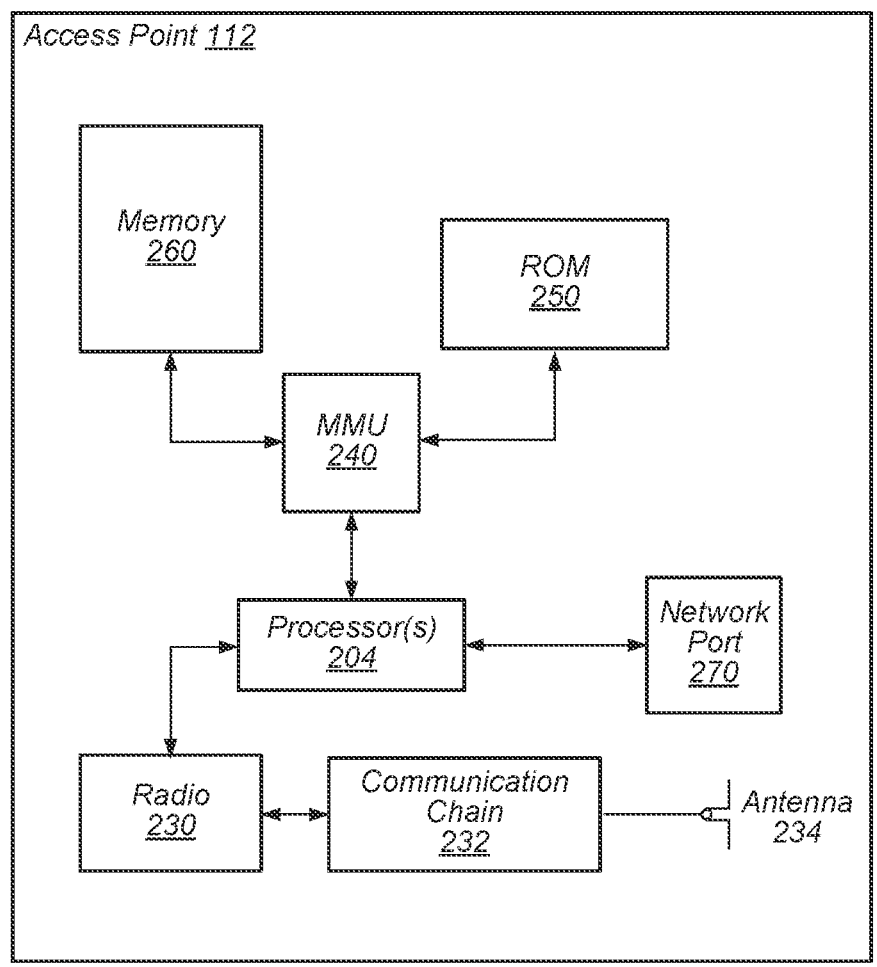
FIG. 2 illustrates an example simplified block diagram of a WLAN Access Point (AP), according to some embodiments.

FIG. 2: Access Point Block Diagram

FIG. 2 illustrates an exemplary block diagram of an access point (AP) 112. It is noted that the block diagram of the AP of FIG. 2 is only one example of a possible system. As shown, the AP 112 may include processor(s) 204 which may execute program instructions for the AP 112. The processor(s) 204 may also be coupled (directly or indirectly) to memory management unit (MMU) 240, which may be configured to receive addresses from the processor(s) 204 and to translate those addresses to locations in memory (e.g., memory 260 and read only memory (ROM) 250) or to other circuits or devices.

The AP 112 may include at least one network port 270. The network port 270 may be configured to couple to a wired network and provide a plurality of devices, such as UEs 106, access to the Internet. For example, the network port 270 (or an additional network port) may be configured to couple to a local network, such as a home network or an enterprise network. For example, port 270 may be an Ethernet port. The local network may provide connectivity to additional networks, such as the Internet.

The AP 112 may include at least one antenna 234, which may be configured to operate as a wireless transceiver and may be further configured to communicate with UE 106 via wireless communication circuitry 230. The antenna 234 communicates with the wireless communication circuitry 230 via communication chain 232. Communication chain 232 may include one or more receive chains, one or more transmit chains or both. The wireless communication circuitry 230 may be configured to communicate via Wi-Fi or WLAN, e.g., 802.11. The wireless communication circuitry 230 may also, or alternatively, be configured to communicate via various other wireless communication technologies, including, but not limited to, 5G NR, Long-Term Evolution (LTE), LTE Advanced (LTE-A), Global System for Mobile (GSM), Wideband Code Division Multiple Access (WCDMA), CDMA2000, etc., for example when the AP is co-located with a base station in case of a small cell, or in other instances when it may be desirable for the AP 112 to communicate via various different wireless communication technologies.

In some embodiments, as further described below, an AP 112 may be configured to perform methods for cancellation and/or replacement of physical uplink shared channels (PUSCHs) with differing priorities, e.g., for ultra-reliable low-latency communication (URLLC) and/or enhanced URLLC (eURLLC) as further described herein.

Figure 3:
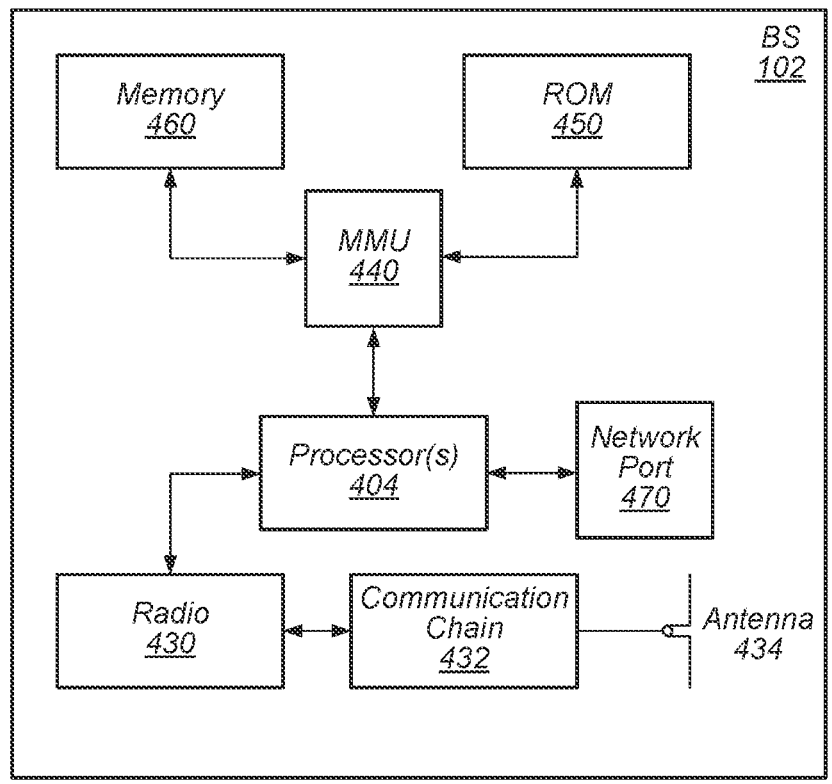
FIG. 3 illustrates an example block diagram of a BS according to some embodiments.

FIG. 3: Block Diagram of a Base Station

FIG. 3 illustrates an example block diagram of a base station 102, according to some embodiments. It is noted that the base station of FIG. 3 is merely one example of a possible base station. As shown, the base station 102 may include processor(s) 404 which may execute program instructions for the base station 102. The processor(s) 404 may also be coupled to memory management unit (MMU) 440, which may be configured to receive addresses from the processor(s) 404 and translate those addresses to locations in memory (e.g., memory 460 and read only memory (ROM) 450) or to other circuits or devices.

The base station 102 may include at least one network port 470. The network port 470 may be configured to couple to a telephone network and provide a plurality of devices, such as UE devices 106, access to the telephone network as described above in FIGS. 1 and 2.

The network port 470 (or an additional network port) may also or alternatively be configured to couple to a cellular network, e.g., a core network of a cellular service provider. The core network may provide mobility related services and/or other services to a plurality of devices, such as UE devices 106. In some cases, the network port 470 may couple to a telephone network via the core network, and/or the core network may provide a telephone network (e.g., among other UE devices serviced by the cellular service provider).

In some embodiments, base station 102 may be a next generation base station, e.g., a 5G New Radio (5G NR) base station, or "gNB". In such embodiments, base station 102 may be connected to a legacy evolved packet core (EPC) network and/or to a NR core (NRC) network. In addition, base station 102 may be considered a 5G NR cell and may include one or more transition and reception points (TRPs). In addition, a UE capable of operating according to 5G NR may be connected to one or more TRPs within one or more gNBs.

The base station 102 may include at least one antenna 434, and possibly multiple antennas. The at least one antenna 434 may be configured to operate as a wireless transceiver and may be further configured to communicate with UE devices 106 via radio 430. The antenna 434 communicates with the radio 430 via communication chain 432. Communication chain 432 may be a receive chain, a transmit chain or both. The radio 430 may be configured to communicate via various wireless communication standards, including, but not limited to, 5G NR, LTE, LTE-A, GSM, UMTS, CDMA2000, Wi-Fi, etc.

The base station 102 may be configured to communicate wirelessly using multiple wireless communication standards. In some instances, the base station 102 may include multiple radios, which may enable the base station 102 to communicate according to multiple wireless communication technologies. For example, as one possibility, the base station 102 may include an LTE radio for performing communication according to LTE as well as a 5G NR radio for performing communication according to 5G NR. In such a case, the base station 102 may be capable of operating as both an LTE base station and a 5G NR base station. As another possibility, the base station 102 may include a multi-mode radio which is capable of performing communications according to any of multiple wireless communication technologies (e.g., 5G NR and Wi-Fi, LTE and Wi-Fi, LTE and UMTS, LTE and CDMA2000, UMTS and GSM, etc.).

As described further subsequently herein, the BS 102 may include hardware and software components for implementing or supporting implementation of features described herein. The processor 404 of the base station 102 may be configured to implement or support implementation of part or all of the methods described herein, e.g., by executing program instructions stored on a memory medium (e.g., a non-transitory computer-readable memory medium). Alternatively, the processor 404 may be configured as a programmable hardware element, such as an FPGA (Field Programmable Gate Array), or as an ASIC (Application Specific Integrated Circuit), or a combination thereof. Alternatively (or in addition) the processor 404 of the BS 102, in conjunction with one or more of the other components 430, 432, 434, 440, 450, 460, 470 may be configured to implement or support implementation of part or all of the features described herein.

In addition, as described herein, processor(s) 404 may be comprised of one or more processing elements. In other words, one or more processing elements may be included in processor(s) 404. Thus, processor(s) 404 may include one or more integrated circuits (ICs) that are configured to perform the functions of processor(s) 404. In addition, each integrated circuit may include circuitry (e.g., first circuitry, second circuitry, etc.) configured to perform the functions of processor(s) 404.

Further, as described herein, radio 430 may be comprised of one or more processing elements. In other words, one or more processing elements may be included in radio 430. Thus, radio 430 may include one or more integrated circuits (ICs) that are configured to perform the functions of radio 430. In addition, each integrated circuit may include circuitry (e.g., first circuitry, second circuitry, etc.) configured to perform the functions of radio 430.

Figure 4:
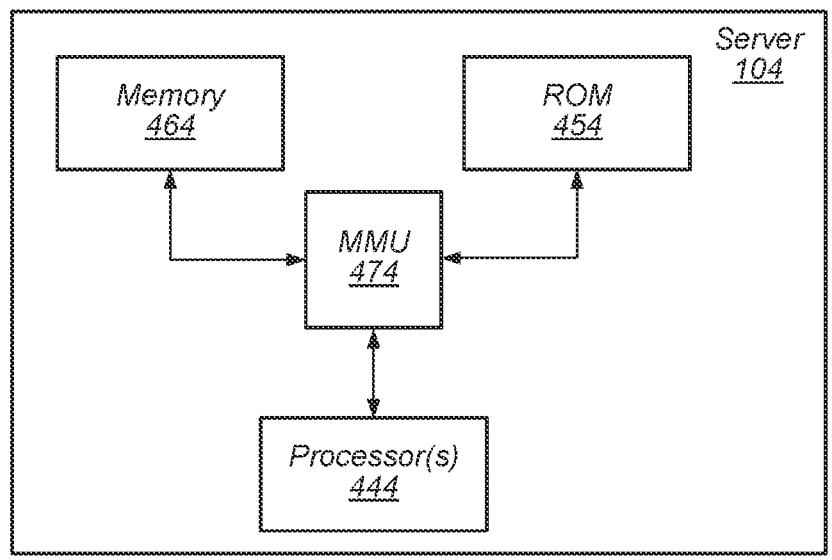
FIG. 4 illustrates an example block diagram of a server according to some embodiments.

FIG. 4: Block Diagram of a Server

FIG. 4 illustrates an example block diagram of a server 104, according to some embodiments. It is noted that the base station of FIG. 4 is merely one example of a possible server. As shown, the server 104 may include processor(s) 444 which may execute program instructions for the server 104. The processor(s) 444 may also be coupled to memory management unit (MMU) 474, which may be configured to receive addresses from the processor(s) 444 and translate those addresses to locations in memory (e.g., memory 464 and read only memory (ROM) 454) or to other circuits or devices.

The server 104 may be configured to provide a plurality of devices, such as base station 102, UE devices 106, and/or UTM 108, access to network functions, e.g., as further described herein.

In some embodiments, the server 104 may be part of a radio access network, such as a 5G New Radio (5G NR) radio access network. In some embodiments, the server 104 may be connected to a legacy evolved packet core (EPC) network and/or to a NR core (NRC) network.

As described further subsequently herein, the server 104 may include hardware and software components for implementing or supporting implementation of features described herein. The processor 444 of the server 104 may be configured to implement or support implementation of part or all of the methods described herein, e.g., by executing program instructions stored on a memory medium (e.g., a non-transitory computer-readable memory medium). Alternatively, the processor 444 may be configured as a programmable hardware element, such as an FPGA (Field Programmable Gate Array), or as an ASIC (Application Specific Integrated Circuit), or a combination thereof. Alternatively (or in addition) the processor 444 of the server 104, in conjunction with one or more of the other components 454, 464, and/or 474 may be configured to implement or support implementation of part or all of the features described herein.

In addition, as described herein, processor(s) 444 may be comprised of one or more processing elements. In other words, one or more processing elements may be included in processor(s) 444. Thus, processor(s) 444 may include one or more integrated circuits (ICs) that are configured to perform the functions of processor(s) 444. In addition, each integrated circuit may include circuitry (e.g., first circuitry, second circuitry, etc.) configured to perform the functions of processor(s) 444.

Figure 5A:
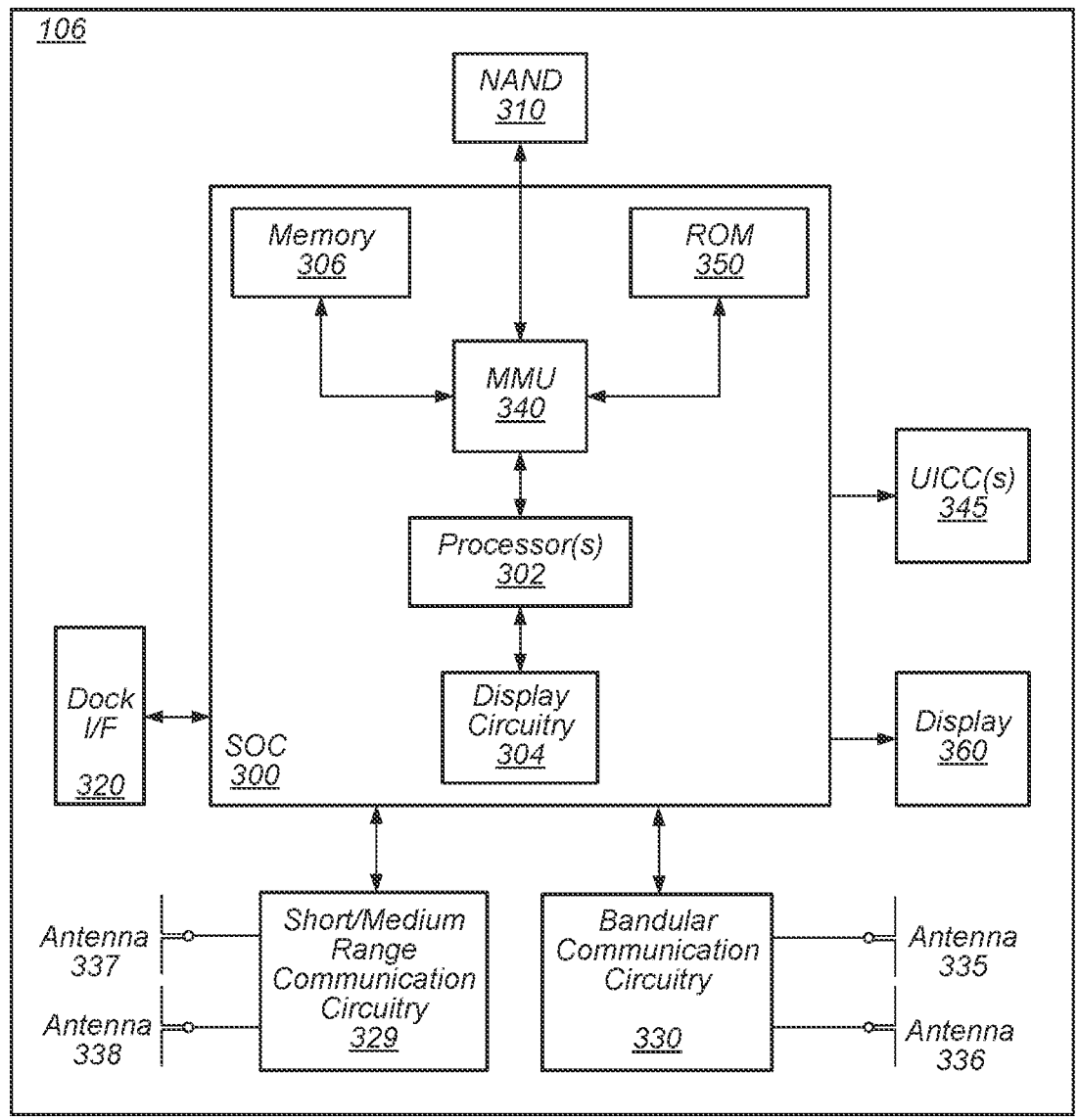
FIG. 5A illustrates an example block diagram of a UE according to some embodiments.

FIG. 5A: Block Diagram of a UE

FIG. 5A illustrates an example simplified block diagram of a communication device 106, according to some embodiments. It is noted that the block diagram of the communication device of FIG. 5A is only one example of a possible communication device. According to embodiments, communication device 106 may be a user equipment (UE) device, a mobile device or mobile station, a wireless device or wireless station, a desktop computer or computing device, a mobile computing device (e.g., a laptop, notebook, or portable computing device), a tablet, an unmanned aerial vehicle (UAV), a UAV controller (UAC) and/or a combination of devices, among other devices. As shown, the communication device 106 may include a set of components 300 configured to perform core functions. For example, this set of components may be implemented as a system on chip (SOC), which may include portions for various purposes. Alternatively, this set of components 300 may be implemented as separate components or groups of components for the various purposes. The set of components 300 may be coupled (e.g., communicatively; directly or indirectly) to various other circuits of the communication device 106.

For example, the communication device 106 may include various types of memory (e.g., including NAND flash memory 310), an input/output interface such as connector OF 320 (e.g., for connecting to a computer system; dock; charging station; input devices, such as a microphone, camera, keyboard; output devices, such as speakers; etc.), the display 360, which may be integrated with or external to the communication device 106, and cellular communication circuitry 330 such as for 5G NR, LTE, GSM, etc., and short to medium range wireless communication circuitry 329 (e.g., Bluetooth™ and WLAN circuitry). In some embodiments, communication device 106 may include wired communication circuitry (not shown), such as a network interface card, e.g., for Ethernet.

The cellular communication circuitry 330 may couple (e.g., communicatively; directly or indirectly) to one or more antennas, such as antennas 335 and 336 as shown. The short to medium range wireless communication circuitry 329 may also couple (e.g., communicatively; directly or indirectly) to one or more antennas, such as antennas 337 and 338 as shown. Alternatively, the short to medium range wireless communication circuitry 329 may couple (e.g., communicatively; directly or indirectly) to the antennas 335 and 336 in addition to, or instead of, coupling (e.g., communicatively; directly or indirectly) to the antennas 337 and 338. The short to medium range wireless communication circuitry 329 and/or cellular communication circuitry 330 may include multiple receive chains and/or multiple transmit chains for receiving and/or transmitting multiple spatial streams, such as in a multiple-input multiple output (MIMO) configuration.

In some embodiments, as further described below, cellular communication circuitry 330 may include dedicated receive chains (including and/or coupled to, e.g., communicatively; directly or indirectly. dedicated processors and/or radios) for multiple RATs (e.g., a first receive chain for LTE and a second receive chain for 5G NR). In addition, in some embodiments, cellular communication circuitry 330 may include a single transmit chain that may be switched between radios dedicated to specific RATs. For example, a first radio may be dedicated to a first RAT, e.g., LTE, and may be in communication with a dedicated receive chain and a transmit chain shared with an additional radio, e.g., a second radio that may be dedicated to a second RAT, e.g., 5G NR, and may be in communication with a dedicated receive chain and the shared transmit chain.

The communication device 106 may also include and/or be configured for use with one or more user interface elements. The user interface elements may include any of various elements, such as display 360 (which may be a touchscreen display), a keyboard (which may be a discrete keyboard or may be implemented as part of a touchscreen display), a mouse, a microphone and/or speakers, one or more cameras, one or more buttons, and/or any of various other elements capable of providing information to a user and/or receiving or interpreting user input.

The communication device 106 may further include one or more smart cards 345 that include SIM (Subscriber Identity Module) functionality, such as one or more UICC(s) (Universal Integrated Circuit Card(s)) cards 345. Note that the term "SIM" or "SIM entity" is intended to include any of various types of SIM implementations or SIM functionality, such as the one or more UICC(s) cards 345, one or more eUICCs, one or more eSIMs, either removable or embedded, etc. In some embodiments, the UE 106 may include at least two SIMs. Each SIM may execute one or more SIM applications and/or otherwise implement SIM functionality. Thus, each SIM may be a single smart card that may be embedded, e.g., may be soldered onto a circuit board in the UE 106, or each SIM 310 may be implemented as a removable smart card. Thus the SIM(s) may be one or more removable smart cards (such as UICC cards, which are sometimes referred to as "SIM cards"), and/or the SIMs 310 may be one or more embedded cards (such as embedded UICCs (eUICCs), which are sometimes referred to as "eSIMs" or "eSIM cards"). In some embodiments (such as when the SIM(s) include an eUICC), one or more of the SIM(s) may implement embedded SIM (eSIM) functionality; in such an embodiment, a single one of the SIM(s) may execute multiple SIM applications. Each of the SIMs may include components such as a processor and/or a memory; instructions for performing SIM/eSIM functionality may be stored in the memory and executed by the processor. In some embodiments, the UE 106 may include a combination of removable smart cards and fixed/non-removable smart cards (such as one or more eUICC cards that implement eSIM functionality), as desired. For example, the UE 106 may comprise two embedded SIMs, two removable SIMs, or a combination of one embedded SIMs and one removable SIMs. Various other SIM configurations are also contemplated.

As noted above, in some embodiments, the UE 106 may include two or more SIMs. The inclusion of two or more SIMs in the UE 106 may allow the UE 106 to support two different telephone numbers and may allow the UE 106 to communicate on corresponding two or more respective networks. For example, a first SIM may support a first RAT such as LTE, and a second SIM 310 support a second RAT such as 5G NR. Other implementations and RATs are of course possible. In some embodiments, when the UE 106 comprises two SIMs, the UE 106 may support Dual SIM Dual Active (DSDA) functionality. The DSDA functionality may allow the UE 106 to be simultaneously connected to two networks (and use two different RATs) at the same time, or to simultaneously maintain two connections supported by two different SIMs using the same or different RATs on the same or different networks. The DSDA functionality may also allow the UE 106 to simultaneously receive voice calls or data traffic on either phone number. In certain embodiments the voice call may be a packet switched communication. In other words, the voice call may be received using voice over LTE (VoLTE) technology and/or voice over NR (VoNR) technology. In some embodiments, the UE 106 may support Dual SIM Dual Standby (DSDS) functionality. The DSDS functionality may allow either of the two SIMs in the UE 106 to be on standby waiting for a voice call and/or data connection. In DSDS, when a call/data is established on one SIM, the other SIM is no longer active. In some embodiments, DSDx functionality (either DSDA or DSDS functionality) may be implemented with a single SIM (e.g., a eUICC) that executes multiple SIM applications for different carriers and/or RATs.

As shown, the SOC 300 may include processor(s) 302, which may execute program instructions for the communication device 106 and display circuitry 304, which may perform graphics processing and provide display signals to the display 360. The processor(s) 302 may also be coupled to memory management unit (MMU) 340, which may be configured to receive addresses from the processor(s) 302 and translate those addresses to locations in memory (e.g., memory 306, read only memory (ROM) 350, NAND flash memory 310) and/or to other circuits or devices, such as the display circuitry 304, short to medium range wireless communication circuitry 329, cellular communication circuitry 330, connector OF 320, and/or display 360. The MMU 340 may be configured to perform memory protection and page table translation or set up. In some embodiments, the MMU 340 may be included as a portion of the processor(s) 302.

As noted above, the communication device 106 may be configured to communicate using wireless and/or wired communication circuitry. The communication device 106 may be configured to perform methods for cancellation and/or replacement of physical uplink shared channels (PUSCHs) with differing priorities, e.g., for ultra-reliable low-latency communication (URLLC) and/or enhanced URLLC (eURLLC) as further described herein.

As described herein, the communication device 106 may include hardware and software components for implementing the above features for a communication device 106 to communicate a scheduling profile for power savings to a network. The processor 302 of the communication device 106 may be configured to implement part or all of the features described herein, e.g., by executing program instructions stored on a memory medium (e.g., a non-transitory computer-readable memory medium). Alternatively (or in addition), processor 302 may be configured as a programmable hardware element, such as an FPGA (Field Programmable Gate Array), or as an ASIC (Application Specific Integrated Circuit). Alternatively (or in addition) the processor 302 of the communication device 106, in conjunction with one or more of the other components 300, 304, 306, 310, 320, 329, 330, 340, 345, 350, 360 may be configured to implement part or all of the features described herein.

In addition, as described herein, processor 302 may include one or more processing elements. Thus, processor 302 may include one or more integrated circuits (ICs) that are configured to perform the functions of processor 302. In addition, each integrated circuit may include circuitry (e.g., first circuitry, second circuitry, etc.) configured to perform the functions of processor(s) 302.

Further, as described herein, cellular communication circuitry 330 and short to medium range wireless communication circuitry 329 may each include one or more processing elements. In other words, one or more processing elements may be included in cellular communication circuitry 330 and, similarly, one or more processing elements may be included in short to medium range wireless communication circuitry 329. Thus, cellular communication circuitry 330 may include one or more integrated circuits (ICs) that are configured to perform the functions of cellular communication circuitry 330. In addition, each integrated circuit may include circuitry (e.g., first circuitry, second circuitry, etc.) configured to perform the functions of cellular communication circuitry 330. Similarly, the short to medium range wireless communication circuitry 329 may include one or more ICs that are configured to perform the functions of short to medium range wireless communication circuitry 329. In addition, each integrated circuit may include circuitry (e.g., first circuitry, second circuitry, etc.) configured to perform the functions of short to medium range wireless communication circuitry 329.

Figure 5B:
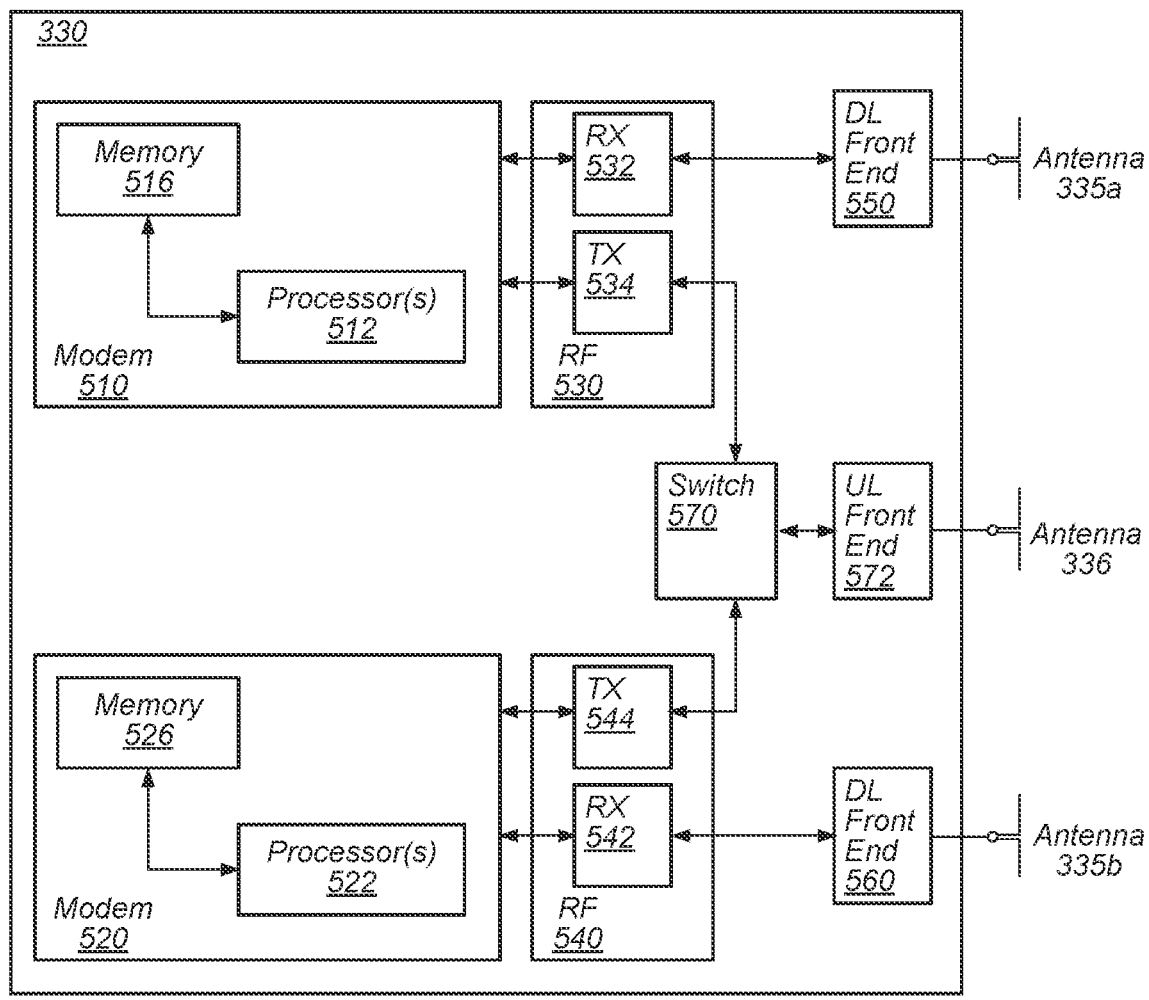
FIG. 5B illustrates an example block diagram of cellular communication circuitry, according to some embodiments.

FIG. 5B: Block Diagram of Cellular Communication Circuitry

FIG. 5B illustrates an example simplified block diagram of cellular communication circuitry, according to some embodiments. It is noted that the block diagram of the cellular communication circuitry of FIG. 5B is only one example of a possible cellular communication circuit. According to embodiments, cellular communication circuitry 330 may be included in a communication device, such as communication device 106 described above. As noted above, communication device 106 may be a user equipment (UE) device, a mobile device or mobile station, a wireless device or wireless station, a desktop computer or computing device, a mobile computing device (e.g., a laptop, notebook, or portable computing device), a tablet and/or a combination of devices, among other devices.

The cellular communication circuitry 330 may couple (e.g., communicatively; directly or indirectly) to one or more antennas, such as antennas 335*a-b* and 336 as shown (in FIG. 3). In some embodiments, cellular communication circuitry 330 may include dedicated receive chains (including and/or coupled to, e.g., communicatively; directly or indirectly. dedicated processors and/or radios) for multiple RATs (e.g., a first receive chain for LTE and a second receive chain for 5G NR). For example, as shown in FIG. 5, cellular communication circuitry 330 may include a modem 510 and a modem 520. Modem 510 may be configured for communications according to a first RAT, e.g., such as LTE or LTE-A, and modem 520 may be configured for communications according to a second RAT, e.g., such as 5G NR.

As shown, modem 510 may include one or more processors 512 and a memory 516 in communication with processors 512. Modem 510 may be in communication with a radio frequency (RF) front end 530. RF front end 530 may include circuitry for transmitting and receiving radio signals. For example, RF front end 530 may include receive circuitry (RX) 532 and transmit circuitry (TX) 534. In some embodiments, receive circuitry 532 may be in communication with downlink (DL) front end 550, which may include circuitry for receiving radio signals via antenna 335*a*.

Similarly, modem 520 may include one or more processors 522 and a memory 526 in communication with processors 522. Modem 520 may be in communication with an RF front end 540. RF front end 540 may include circuitry for transmitting and receiving radio signals. For example, RF front end 540 may include receive circuitry 542 and transmit circuitry 544. In some embodiments, receive circuitry 542 may be in communication with DL front end 560, which may include circuitry for receiving radio signals via antenna 335*b*.

In some embodiments, a switch 570 may couple transmit circuitry 534 to uplink (UL) front end 572. In addition, switch 570 may couple transmit circuitry 544 to UL front end 572. UL front end 572 may include circuitry for transmitting radio signals via antenna 336. Thus, when cellular communication circuitry 330 receives instructions to transmit according to the first RAT (e.g., as supported via modem 510), switch 570 may be switched to a first state that allows modem 510 to transmit signals according to the first RAT (e.g., via a transmit chain that includes transmit circuitry 534 and UL front end 572). Similarly, when cellular communication circuitry 330 receives instructions to transmit according to the second RAT (e.g., as supported via modem 520), switch 570 may be switched to a second state that allows modem 520 to transmit signals according to the second RAT (e.g., via a transmit chain that includes transmit circuitry 544 and UL front end 572).

In some embodiments, the cellular communication circuitry 330 may be configured to perform methods cancellation and/or replacement of physical uplink shared channels (PUSCHs) with differing priorities, e.g., for ultra-reliable low-latency communication (URLLC) and/or enhanced URLLC (eURLLC) as further described herein.

As described herein, the modem 510 may include hardware and software components for implementing the above features or for time division multiplexing UL data for NSA NR operations, as well as the various other techniques described herein. The processors 512 may be configured to implement part or all of the features described herein, e.g., by executing program instructions stored on a memory medium (e.g., a non-transitory computer-readable memory medium). Alternatively (or in addition), processor 512 may be configured as a programmable hardware element, such as an FPGA (Field Programmable Gate Array), or as an ASIC (Application Specific Integrated Circuit). Alternatively (or in addition) the processor 512, in conjunction with one or more of the other components 530, 532, 534, 550, 570, 572, 335 and 336 may be configured to implement part or all of the features described herein.

In addition, as described herein, processors 512 may include one or more processing elements. Thus, processors 512 may include one or more integrated circuits (ICs) that are configured to perform the functions of processors 512. In addition, each integrated circuit may include circuitry (e.g., first circuitry, second circuitry, etc.) configured to perform the functions of processors 512.

As described herein, the modem 520 may include hardware and software components for implementing the above features for communicating a scheduling profile for power savings to a network, as well as the various other techniques described herein. The processors 522 may be configured to implement part or all of the features described herein, e.g., by executing program instructions stored on a memory medium (e.g., a non-transitory computer-readable memory medium). Alternatively (or in addition), processor 522 may be configured as a programmable hardware element, such as an FPGA (Field Programmable Gate Array), or as an ASIC (Application Specific Integrated Circuit). Alternatively (or in addition) the processor 522, in conjunction with one or more of the other components 540, 542, 544, 550, 570, 572, 335 and 336 may be configured to implement part or all of the features described herein.

In addition, as described herein, processors 522 may include one or more processing elements. Thus, processors 522 may include one or more integrated circuits (ICs) that are configured to perform the functions of processors 522. In addition, each integrated circuit may include circuitry (e.g., first circuitry, second circuitry, etc.) configured to perform the functions of processors 522.

Figure 6A:
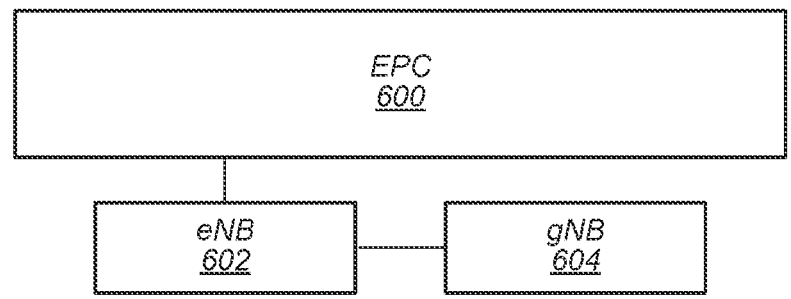
FIG. 6A illustrates an example of connections between an EPC network, an LTE base station (eNB), and a 5G NR base station (gNB).
Figure 6B:
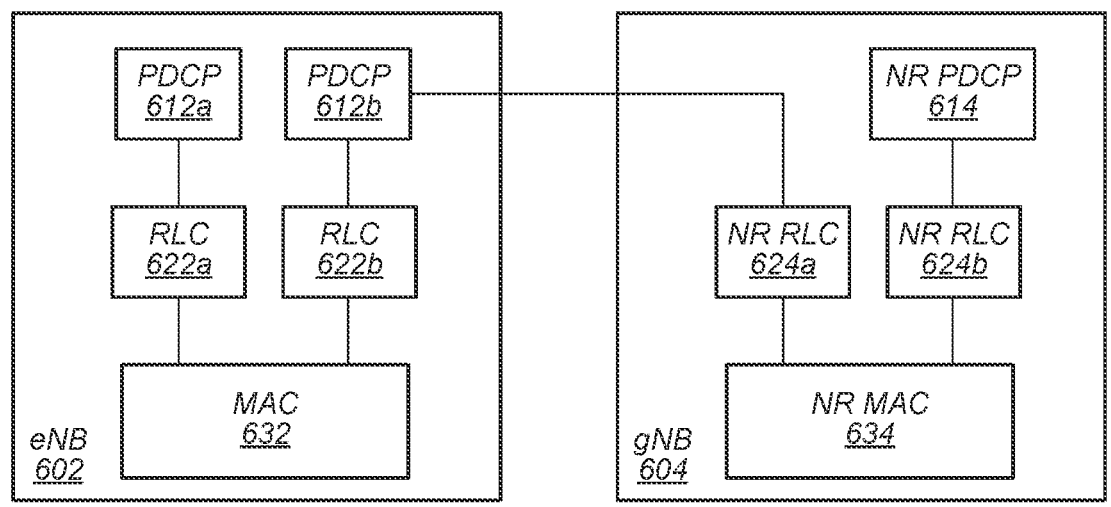
FIG. 6B illustrates an example of a protocol stack for an eNB and a gNB.

FIGS. 6A and 6B: 5G NR Architecture with LTE

In some implementations, fifth generation (5G) wireless communication will initially be deployed concurrently with current wireless communication standards (e.g., LTE). For example, dual connectivity between LTE and 5G new radio (5G NR or NR) has been specified as part of the initial deployment of NR. Thus, as illustrated in FIGS. 6A-B, evolved packet core (EPC) network 600 may continue to communicate with current LTE base stations (e.g., eNB 602). In addition, eNB 602 may be in communication with a 5G NR base station (e.g., gNB 604) and may pass data between the EPC network 600 and gNB 604. Thus, EPC network 600 may be used (or reused) and gNB 604 may serve as extra capacity for UEs, e.g., for providing increased downlink throughput to UEs. In other words, LTE may be used for control plane signaling and NR may be used for user plane signaling. Thus, LTE may be used to establish connections to the network and NR may be used for data services.

FIG. 6B illustrates a proposed protocol stack for eNB 602 and gNB 604. As shown, eNB 602 may include a medium access control (MAC) layer 632 that interfaces with radio link control (RLC) layers 622a-b. RLC layer 622a may also interface with packet data convergence protocol (PDCP) layer 612a and RLC layer 622b may interface with PDCP layer 612b. Similar to dual connectivity as specified in LTE-Advanced Release 12, PDCP layer 612a may interface via a master cell group (MCG) bearer with EPC network 600 whereas PDCP layer 612b may interface via a split bearer with EPC network 600.

Additionally, as shown, gNB 604 may include a MAC layer 634 that interfaces with RLC layers 624a-b. RLC layer 624a may interface with PDCP layer 612b of eNB 602 via an $X_2$ interface for information exchange and/or coordination (e.g., scheduling of a UE) between eNB 602 and gNB 604. In addition, RLC layer 624b may interface with PDCP layer 614. Similar to dual connectivity as specified in LTE-Advanced Release 12, PDCP layer 614 may interface with EPC network 600 via a secondary cell group (SCG) bearer. Thus, eNB 602 may be considered a master node (MeNB) while gNB 604 may be considered a secondary node (SgNB). In some scenarios, a UE may be required to maintain a connection to both an MeNB and a SgNB. In such scenarios, the MeNB may be used to maintain a radio resource control (RRC) connection to an EPC while the SgNB may be used for capacity (e.g., additional downlink and/or uplink throughput).

Figure 7A:
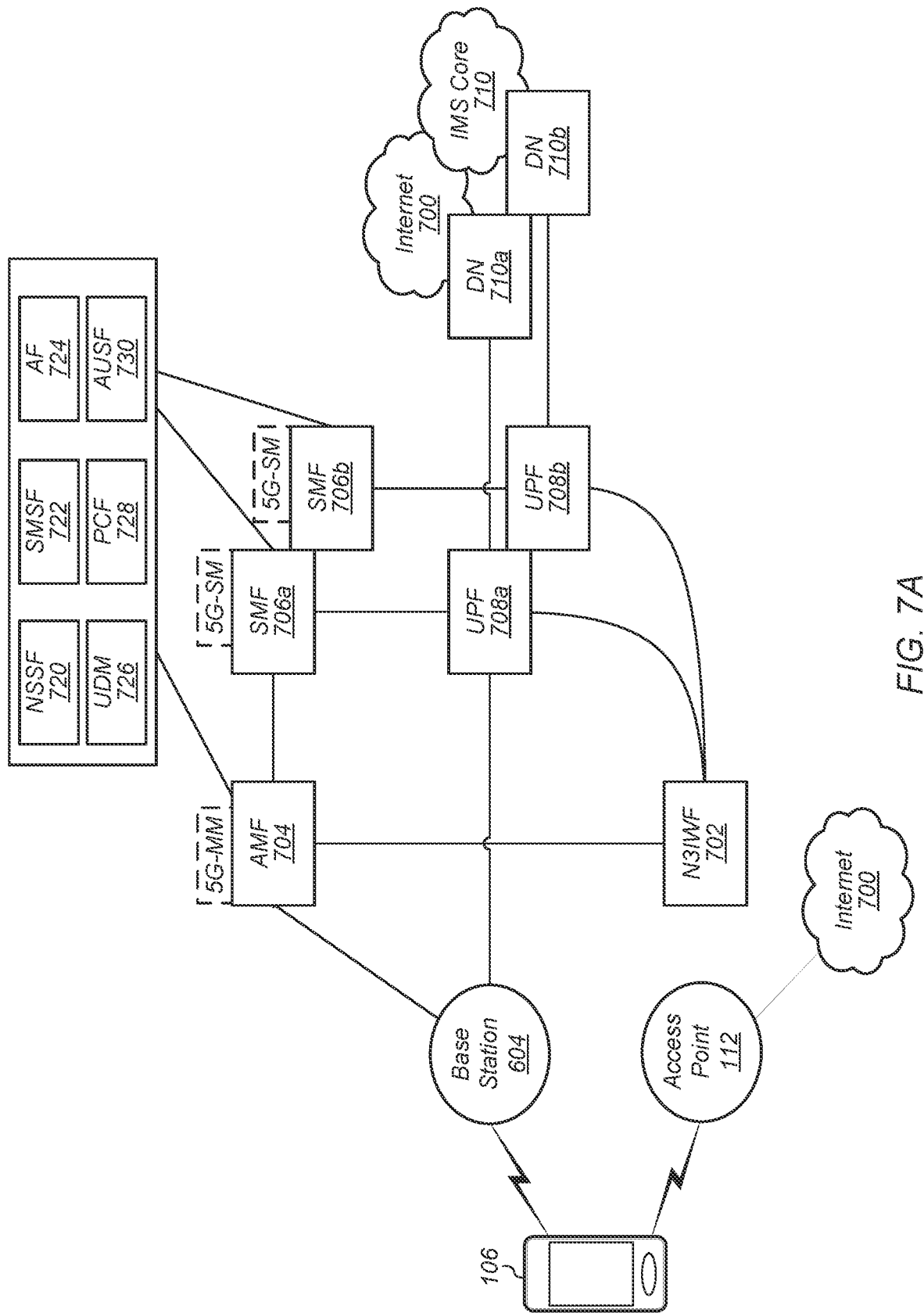
FIG. 7A illustrates an example of a 5G network architecture that incorporates both 3GPP (e.g., cellular) and non-3GPP (e.g., non-cellular) access to the 5G CN, according to some embodiments.
Figure 7B:
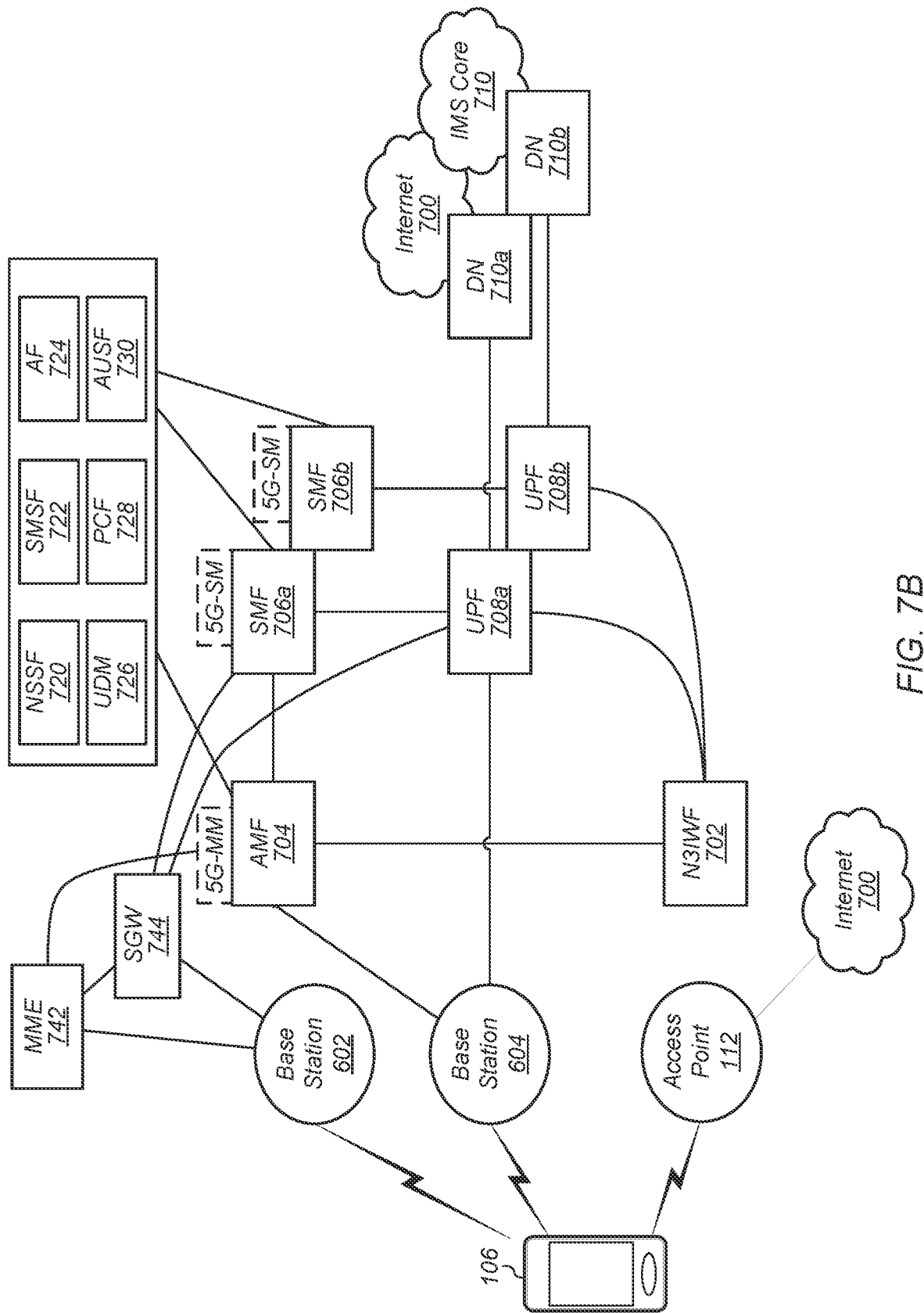
FIG. 7B illustrates an example of a 5G network architecture that incorporates both dual 3GPP (e.g., LTE and 5G NR) access and non-3GPP access to the 5G CN, according to some embodiments.
Figure 8:
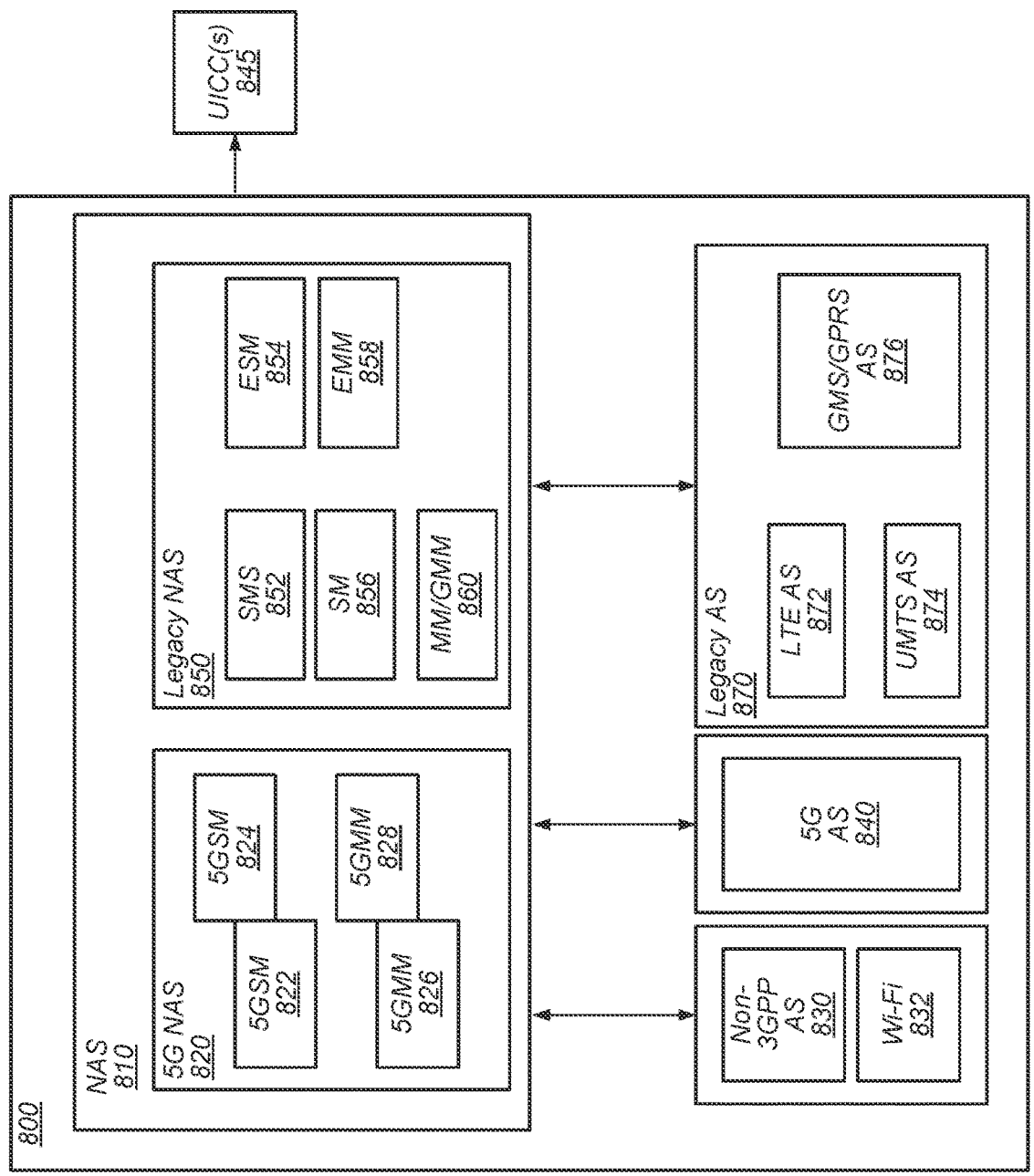
FIG. 8 illustrates an example of a baseband processor architecture for a UE, according to some embodiments.

FIGS. 7A, 7B and 8: 5G Core Network Architecture—Interworking with Wi-Fi

In some embodiments, the 5G core network (CN) may be accessed via (or through) a cellular connection/interface (e.g., via a 3GPP communication architecture/protocol) and a non-cellular connection/interface (e.g., a non-3GPP access architecture/protocol such as Wi-Fi connection). FIG. 7A illustrates an example of a 5G network architecture that incorporates both 3GPP (e.g., cellular) and non-3GPP (e.g., non-cellular) access to the 5G CN, according to some embodiments. As shown, a user equipment device (e.g., such as UE 106) may access the 5G CN through both a radio access network (RAN, e.g., such as gNB or base station 604) and an access point, such as AP 112. The AP 112 may include a connection to the Internet 700 as well as a connection to a non-3GPP inter-working function (N3IWF) 702 network entity. The N3IWF may include a connection to a core access and mobility management function (AMF) 704 of the 5G CN. The AMF 704 may include an instance of a 5G mobility management (5G MM) function associated with the UE 106. In addition, the RAN (e.g., gNB 604) may also have a connection to the AMF 704. Thus, the 5G CN may support unified authentication over both connections as well as allow simultaneous registration for UE 106 access via both gNB 604 and AP 112. As shown, the AMF 704 may include one or more functional entities associated with the 5G CN (e.g., network slice selection function (NSSF) 720, short message service function (SMSF) 722, application function (AF) 724, unified data management (UDM) 726, policy control function (PCF) 728, and/or authentication server function (AUSF) 730). Note that these functional entities may also be supported by a session management function (SMF) 706*a* and an SMF 706*b* of the 5G CN. The AMF 706 may be connected to (or in communication with) the SMF 706*a*. Further, the gNB 604 may in communication with (or connected to) a user plane function (UPF) 708*a* that may also be communication with the SMF 706*a*. Similarly, the N3IWF 702 may be communicating with a UPF 708*b* that may also be communicating with the SMF 706*b*. Both UPFs may be communicating with the data network (e.g., DN 710*a* and 710*b*) and/or the Internet 700 and Internet Protocol (IP) Multimedia Subsystem/IP Multimedia Core Network Subsystem (IMS) core network 710.

FIG. 7B illustrates an example of a 5G network architecture that incorporates both dual 3GPP (e.g., LTE and 5G NR) access and non-3GPP access to the 5G CN, according to some embodiments. As shown, a user equipment device (e.g., such as UE 106) may access the 5G CN through both a radio access network (RAN, e.g., such as gNB or base station 604 or eNB or base station 602) and an access point, such as AP 112. The AP 112 may include a connection to the Internet 700 as well as a connection to the N3IWF 702 network entity. The N3IWF may include a connection to the AMF 704 of the 5G CN. The AMF 704 may include an instance of the 5G MM function associated with the UE 106. In addition, the RAN (e.g., gNB 604) may also have a connection to the AMF 704. Thus, the 5G CN may support unified authentication over both connections as well as allow simultaneous registration for UE 106 access via both gNB 604 and AP 112. In addition, the 5G CN may support dual-registration of the UE on both a legacy network (e.g., LTE via base station 602) and a 5G network (e.g., via base station 604). As shown, the base station 602 may have connections to a mobility management entity (MME) 742 and a serving gateway (SGW) 744. The MME 742 may have connections to both the SGW 744 and the AMF 704. In addition, the SGW 744 may have connections to both the SMF 706*a* and the UPF 708*a*. As shown, the AMF 704 may include one or more functional entities associated with the 5G CN (e.g., NSSF 720, SMSF 722, AF 724, UDM 726, PCF 728, and/or AUSF 730). Note that UDM 726 may also include a home subscriber server (HSS) function and the PCF may also include a policy and charging rules function (PCRF). Note further that these functional entities may also be supported by the SMF 706*a* and the SMF 706*b* of the 5G CN. The AMF 706 may be connected to (or in communication with) the SMF 706*a*. Further, the gNB 604 may in communication with (or connected to) the UPF 708*a* that may also be communication with the SMF 706*a*. Similarly, the N3IWF 702 may be communicating with a UPF 708*b* that may also be communicating with the SMF 706*b*. Both UPFs may be communicating with the data network (e.g., DN 710*a* and 710*b*) and/or the Internet 700 and IMS core network 710.

Note that in various embodiments, one or more of the above described network entities may be configured to perform methods to improve security checks in a 5G NR network, including mechanisms cancellation and/or replacement of physical uplink shared channels (PUSCHs) with differing priorities, e.g., for ultra-reliable low-latency communication (URLLC) and/or enhanced URLLC (eURLLC), e.g., as further described herein.

FIG. 8 illustrates an example of a baseband processor architecture for a UE (e.g., such as UE 106), according to some embodiments. The baseband processor architecture 800 described in FIG. 8 may be implemented on one or more radios (e.g., radios 329 and/or 330 described above) or modems (e.g., modems 510 and/or 520) as described above. As shown, the non-access stratum (NAS) 810 may include a 5G NAS 820 and a legacy NAS 850. The legacy NAS 850 may include a communication connection with a legacy access stratum (AS) 870. The 5G NAS 820 may include communication connections with both a 5G AS 840 and a non-3GPP AS 830 and Wi-Fi AS 832. The 5G NAS 820 may include functional entities associated with both access stratums. Thus, the 5G NAS 820 may include multiple 5G MM entities 826 and 828 and 5G session management (SM) entities 822 and 824. The legacy NAS 850 may include functional entities such as short message service (SMS) entity 852, evolved packet system (EPS) session management (ESM) entity 854, session management (SM) entity 856, EPS mobility management (EMM) entity 858, and mobility management (MM)/GPRS mobility management (GMM) entity 860. In addition, the legacy AS 870 may include functional entities such as LTE AS 872, UMTS AS 874, and/or GSM/GPRS AS 876.

Thus, the baseband processor architecture 800 allows for a common 5G-NAS for both 5G cellular and non-cellular (e.g., non-3GPP access). Note that as shown, the 5G MM may maintain individual connection management and registration management state machines for each connection. Additionally, a device (e.g., UE 106) may register to a single PLMN (e.g., 5G CN) using 5G cellular access as well as non-cellular access. Further, it may be possible for the device to be in a connected state in one access and an idle state in another access and vice versa. Finally, there may be common 5G-MM procedures (e.g., registration, de-registration, identification, authentication, as so forth) for both accesses.

Note that in various embodiments, one or more of the above described functional entities of the 5G NAS and/or 5G AS may be configured to perform methods cancellation and/or replacement of physical uplink shared channels (PUSCHs) with differing priorities, e.g., for ultra-reliable low-latency communication (URLLC) and/or enhanced URLLC (eURLLC), e.g., as further described herein.

PUSCH Cancellation and/or Replacement

In current implementations, e.g., such as implementations standardized by 3GPP Release 15, a physical uplink shared channel (PUSCH) may be scheduled with downlink control information (DCI) on a physical downlink control channel (PDCCH) and/or through a configured grant (CG). Note that in various implementations, PUSCH may be used to carry (e.g., transmit from a UE to a network entity, such as a base station) radio resource control (RRC) signaling messages, uplink control information, and/or application (or user) data. Additionally, there are two types of configured (uplink) grants: type 1 and type 2. For a type 1 CG, RRC signaling provides a configured uplink grant (including a periodicity) whereas for type 2, RRC signaling defines a periodicity of the configured uplink grant while PDCCH addressed to configured scheduling radio network temporary identifier (CS-RNTI) may either signal and activate the configured uplink grant or deactivate the configured uplink grant. In other words; a PDCCH addressed to CS-RNTI may indicate that the configured uplink grant may be implicitly reused according to the periodicity defined by RRC, e.g., until deactivated.

Additionally, in current implementations, e.g., such as implementations standardized by 3GPP Release 15, a single slot transmission, with PUSCH mapping type A or PUSCH mapping type B, can be used for a dynamic uplink grant or a configured uplink grant. Additionally, a PUSCH with slot aggregation can be used for dynamic uplink grant (DG) and/or configured uplink grant (CG). Hence, for PUSCH with slot aggregation, a transport block may be used for transmissions in different slots following a hybrid automatic repeat request (HARQ) redundancy version sequence. The number of slots involved in slot aggregation (e.g., aggregation factor) may be configured separately through RRC signaling. Further, for a DG PUSCH, an aggregation factor may be configured for the DG PUSCH through pusch-AggregationFactor {n2, n4, n8} (e.g., 2 slots, 4 slots, and/or 8 slots). Additionally, for a CG PUSCH, an aggregation factor may be configured through a parameter repK {n1, n2, n4, n8} (e.g., 1 slot, 2 slots, 4 slots, or 8 slots). As for HARQ redundancy version sequence for slot aggregation, for CG PUSCH, the HARQ redundancy version sequence may RRC configured, e.g., repK-RV {s1-0231, s2-0303, s3-0000}. Additionally, the HARQ redundancy version sequence for DG PUSCH may derived from s1-0231 through repetition while a first used redundancy version may be dynamically signaled by a base station in an uplink DCI, e.g., the base station may signal starting a PUSCH slot aggregation with "3". Hence, if a pusch-AggregationFactor is n8, then HARQ redundancy version sequence [3102 3102] may be used for transmission over 8 slots. Note that in 3GPP Release 15, pusch-AggregationFactor and repK may be RRC configured for both DG and CG, respectively. Additionally, with PUSCH slot aggregation, while HARQ redundancy versions may be different for transmissions in different slots, time-frequency resources occupied by the PUSCH may be the same across slots.

Further, in current implementations, e.g., such as implementations standardized by 3GPP Release 15, higher layer configured parameters repK and repK-RV may define K repetitions to be applied to a transmitted transport block and a redundancy version pattern to be applied to the repetitions. In addition, if the parameter repK-RV is not provided in the CG configuration (e.g., via a configuredGrantConfig parameter), a redundancy version for uplink transmissions with a configured grant may be set to 0. Otherwise, for the nth transmission occasion among K repetitions, n=1, 2, . . . , K, the redundancy version may be associated with (mod(n−1, 4)+1)th value in the configured RV sequence. Hence, the initial transmission of a transport block may start at
  (i) a first transmission occasion of the K repetitions if the configured RV sequence is {0,2,3,1};
  (ii) any transmission occasion of the K repetitions that are associated with RV=0 if the configured RV sequence is {0,3,0,3}; and/or
  (iii) any transmission occasions of the K repetitions if the configured RV sequence is {0,0,0,0}, except the last transmission occasion when K=8.
Note that for any RV sequence, repetitions may be terminated after transmitting K repetitions and/or at a last transmission occasion among the K repetitions within a period P and/or from a starting symbol of the repetition that overlaps with a PUSCH with the same HARQ process scheduled by DCI format 0_0 or DCI format 0_1, whichever is reached first. Note further, that the UE may not be expected to be configured with a time duration for the transmission of K repetitions larger than a time duration derived by the periodicity, P. Additionally, if the UE determines that, for a transmission occasion, the number of symbols available for the PUSCH transmission in a slot is smaller than transmission duration L, the UE does not transmit the PUSCH in the transmission occasion. Note that for both Type 1 and Type 2 PUSCH transmissions with a configured grant, when the UE is configured with repK>1, the UE may repeat the transmission block across the repK consecutive slots applying the same symbol allocation in each slot. In addition, a Type 1 or Type 2 PUSCH transmission with a configured grant in a slot may be omitted according to conditions as specified in 3GPP TS 38.213.

In addition, in current implementations, e.g., such as implementations standardized by 3GPP Release 15, with a configured grant configuration, uplink resources may be available for data transmission from a UE. However, if there is no data in a buffer for configured grant transmission, the UE does not need to transmit over the configured resources. Thus, it is useful differentiate an actual CG PUSCH transmission and CG PUSCH transmission occasion. Thus, as CG transmission is initiated by the UE and a base station may not be aware of a potential CG transmission initiated by the UE, two conditions are defined concerning DG scheduling timing, e.g., so the UE may have enough time to prepare for DG transmission if the DG transmission overlaps with the CG transmission occasion.

A first condition/restriction regarding DG scheduled over (e.g., time overlapping a) CG transmission occasion is that a UE may not be expected to be scheduled by a physical downlink control channel (PDCCH) ending in symbol i to transmit a physical uplink shared channel (PUSCH) on a serving cell overlapping in time with a transmission occasion, where the UE is allowed to transmit a PUSCH with a configured grant (e.g., as defined in 3GPP TS 38.321 Release 15), starting in a symbol j on the serving cell if the end of symbol I is not at least $N_2$ symbols before the beginning of symbol j. Note that in such instances, the value of $N_2$ in symbols is determined according to processing capabilities of the UE as defined in 3GPP Release 15. Additionally, in such instances, $N_2$ and the symbol duration may be based on a minimum of a subcarrier spacing corresponding to the PUSCH with the configured grant and a subcarrier spacing of the PDCCH scheduling the PUSCH.

Additionally, a second condition regarding CG is that a UE may not be expected to be scheduled by a PDCCH ending in symbol i to transmit a PUSCH on a serving cell for a hybrid automatic repeat request (HARQ) process if there is a transmission occasion where the UE is allowed to transmit a PUSCH with a configured grant (e.g., as defined in 3GPP TS 38.321 Release 15) with the HARQ process on the serving cell starting in a symbol j occurring after symbol i and if the gap between the end of the PDCCH and the beginning of symbol j is less than $N_2$ symbols. Note that in such instances, the value of $N_2$ in symbols is determined according to processing capabilities of the UE as defined in 3GPP Release 15. Additionally, in such instances, $N_2$ and the symbol duration may be based on a minimum of a subcarrier spacing corresponding to the PUSCH with the configured grant and a subcarrier spacing of the PDCCH scheduling the PUSCH.

In the first condition described above, PDCCH scheduling a DG PUSCH which overlaps with a CG PUSCH transmission occasion has to come N2 symbols prior to the start of the CG PUSCH transmission occasion. Thus, with this first condition, the UE does not need to handle the case where the PDCCH scheduling a DG PUSCH comes less than N2 symbols prior to the start of the CG PUSCH transmission occasion. In the second condition described above, if a DG PUSCH has the same HARQ process ID as the HARQ process ID associated with CG PUSCH transmission occasion, no matter whether the DG PUSCH overlaps with the CG PUSCH transmission occasion or not, the PDCCH scheduling the DG PUSCH has to come at least $N_2$ symbols prior to the start of the CG transmission occasion.

Figure 9:
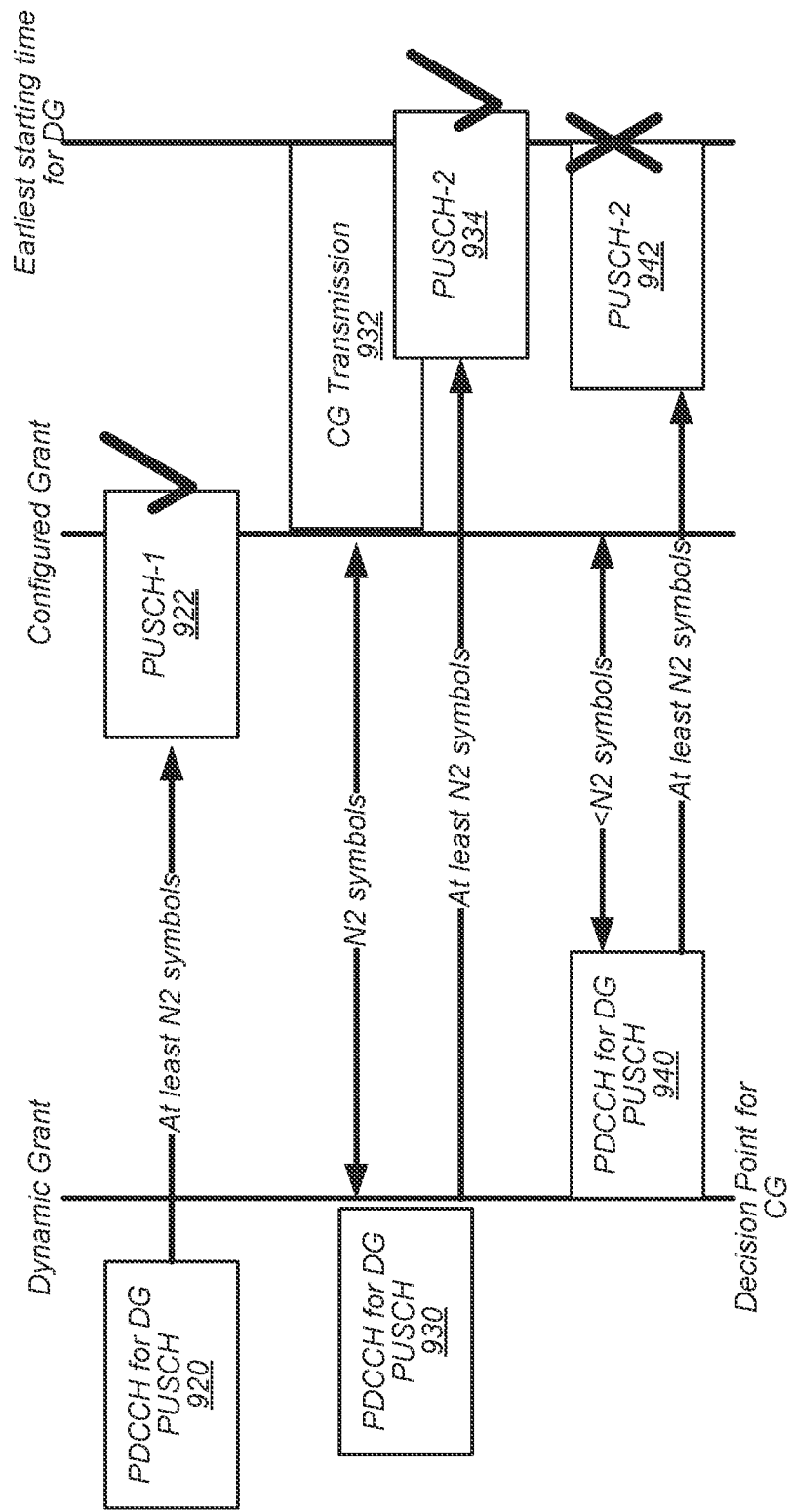
FIG. 9 illustrates examples of dynamic grants colliding with configured grants.

For example, under the first condition described above, three cases may be defined as illustrated by FIG. 9. In a first case, in which a dynamic grant, e.g., PDCCH for DG PUSCH 920, schedules a transmission to occur before a configured grant opportunity, then, so long at PUSCH-1 922 (e.g., configured by PDCCH for DG PUSCH 920) occurs at least $N_2$ symbols after the dynamic grant, the transmission will be successful, as shown. In a second case, in which a dynamic grant, e.g., PDCCH for DG PUSCH 930, schedules a transmission to occur after a configured grant opportunity, then, even if PUSCH-2 934 occurs at least $N_2$ symbols after the dynamic grant, the transmission will be dropped in favor of a configured grant transmission, e.g., CG transmission 932, as shown. In a third case, in which a dynamic grant, e.g., PDCCH for DG PUSCH 940 occurs less than $N_2$ symbols before the configured grant opportunity, then the scheduled transmission PUSCH-2 942 will be dropped as the dynamic grant occurred within $N_2$ symbols of the configured grant opportunity and is thus, not allowed.

Figure 10:
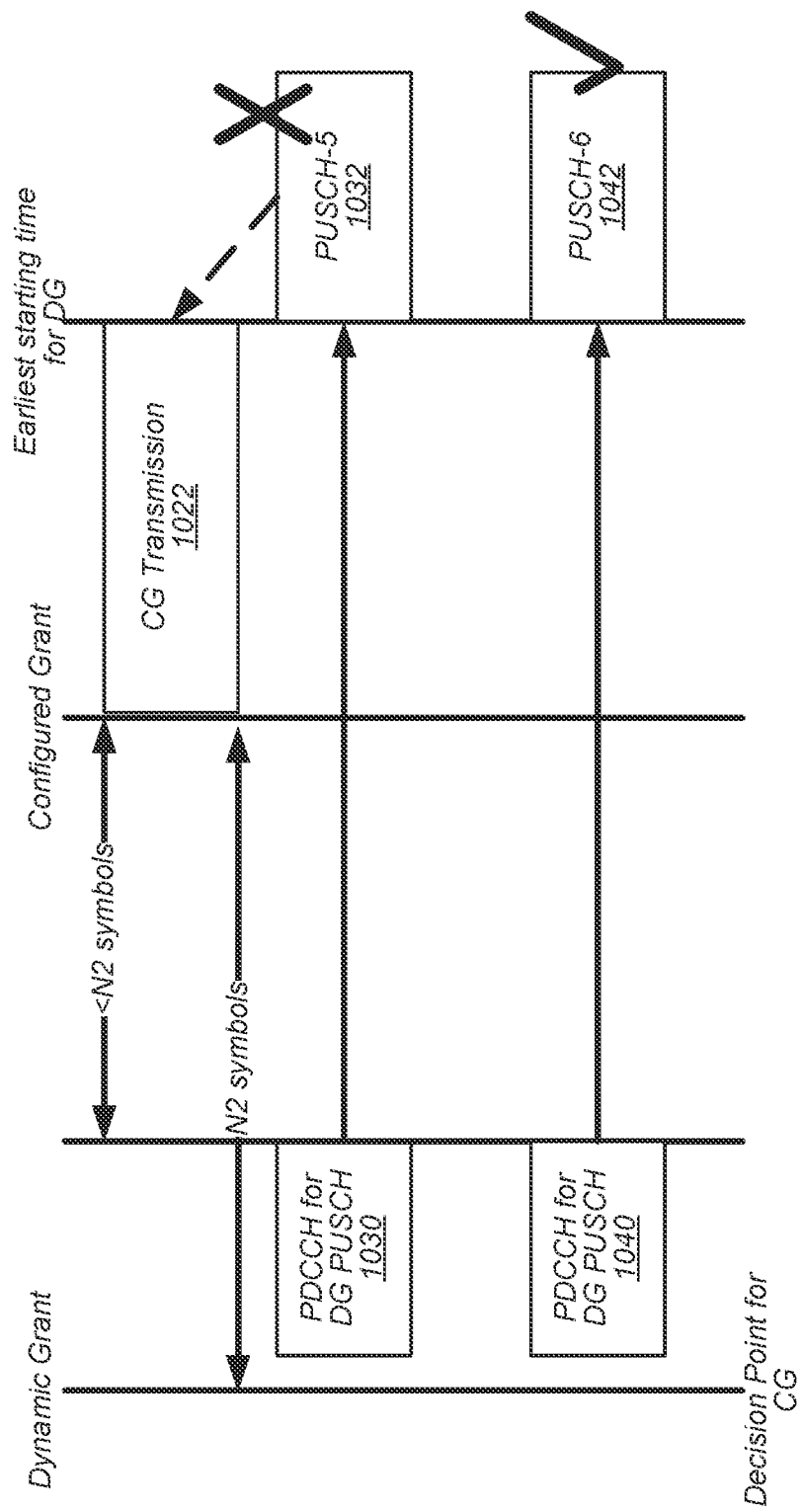
FIG. 10 illustrates further examples of dynamic grants colliding with configured grants.

As another example, under the second condition described above, two cases may be defined as illustrated by FIG. 10. As shown, a first CG configuration may be associated with a first HARQ process and a second CG configuration may be associated with a second HARQ process, thus CG transmission 1022 may be associated with both the first and second HARQ processes. In a first case, a dynamic grant, e.g., PDCCH for DG PUSCH 1030, schedules a transmission associated with the first HARQ process, e.g., PUSCH-5 1032, to occur at an earliest starting time for a dynamic grant, however, under the second condition, the transmission will be dropped as not allowed. In a second case, a dynamic grant, e.g., PDCCH for DG PUSCH 1040, schedules a transmission associated with a third HARQ process, e.g., PUSCH-6 1042, to occur at an earliest starting time for a dynamic grant and, under the second condition, the transmission will occur as the transmission is not associated with the first or second HARQ process.

Hence, in current implementations, if a DG grant for PUSCH is sent at least $N_2$ symbols before the start of a CG transmission occasion, any DG transmission (e.g., no restriction on HARQ process ID, no restriction on overlapping with CG transmission occasion, but at least $N_2$ symbols between scheduling DCI and DG transmission) may be allowed. Additionally, in current implementations, if a DG grant for PUSCH is sent at fewer than $N_2$ symbols before the start of CG transmission occasion, as long as the DG PUSCH starts after the CG transmission occasion (note that the case that the DG PUSCH overlaps with the CG transmission occasion is excluded by the first condition and the case the DG PUSCH starts prior to the CG transmission occasion is not allowed as its gap to the scheduling DCI would be less than $N_2$) and the DG PUSCH HARQ process identifier (ID) does not overlap with any of the CG transmission occasion's HARQ process IDs, then the DG PUSCH may be allowed.

In addition to these conditions, in current implementations, e.g., such as implementations standardized by 3GPP Release 15, for a DG PUSCH scheduled by a DCI overriding a CG PUSCH configured with repetition factor K>1:
  (i) if a HARQ process is the same between the DG and the CG, DG overrides all remaining repetition occasions after the end of PDCCH reception, e.g., under a timeline specified in 3GPP TS 38.214 section 6.1;
  (ii) otherwise, DG overrides only the CG repetition overlapped with DG, e.g., under a timeline specified in 3GPP TS 38.214 section 6.1.

Further, a DG overriding a CG is supported when the timeline conditions are satisfied in various instances.

For example, a DG overriding a CG is supported when the timeline conditions are satisfied if the DG has a different HARQ Process ID from that of the CG's. Note that in a first scenario, the DG may be a single transmission and the CG may be a single transmission. In such a scenario, if the CG collides with the DG, then the CG is dropped or overridden, and the UE may conduct transmission with the DG. Note that in a second scenario, the DG may be single transmission and the CG may be with slot aggregation. In such a scenario, if a CG transmission at a transmission occasion collides with the DG, then the CG transmission at that transmission occasion is dropped or overridden, and the UE may conduct transmission with the DG. Additionally, for transmission occasions not colliding the DG, CG transmissions may be conducted by the UE. Note further that in a third scenario, a DG may be with slot aggregation and the CG may be with slot aggregation. In such a scenario, if a CG transmission at a transmission occasion collides with a DG transmission, then the CG transmission at that transmission occasion is dropped or overridden, and the UE may conduct transmission with the DG transmission. Additionally; for CG transmission occasions not colliding with any DG transmissions, CG transmissions may be conducted by the UE. Further, in a fourth scenario, a DG may be with slot aggregation and the CG may be a single slot transmission.

In addition, a DG overriding a CG is supported when the timeline conditions are satisfied if the DG has the same HARQ Process ID from that of the CG's. Note that in a first scenario, the DG is may be a single transmission and the CG may be a single transmission. In such a scenario, if the CG collides with the DG, then the CG is dropped or overridden, and the UE may conduct transmission with the DG. In a second scenario, the DG may be a single transmission and the CG may be with slot aggregation. In such a scenario, if a CG transmission at a transmission occasion collides with the DG, then the CG transmission at that transmission occasion and subsequent transmission occasions are dropped (or overridden), and the UE may conduct transmission with the DG. In a third scenario, the DG may be with slot aggregation and the CG may be with slot aggregation.

As a further example, a DG overriding a CG is supported when the timeline conditions are satisfied if a CG transmission at an occasion collides with a DG transmission, then the CG transmission at that occasion and subsequent occasions are dropped (or overridden), and the UE conducts transmission with the DG transmission.

Additionally, a DG overriding a CG is supported when the timeline conditions are satisfied if the CG transmission at an occasion collides with a DG transmission, then the CG transmission at that occasion is dropped or overridden, and the UE conducts transmission with the DG transmission.

Figure 12A:
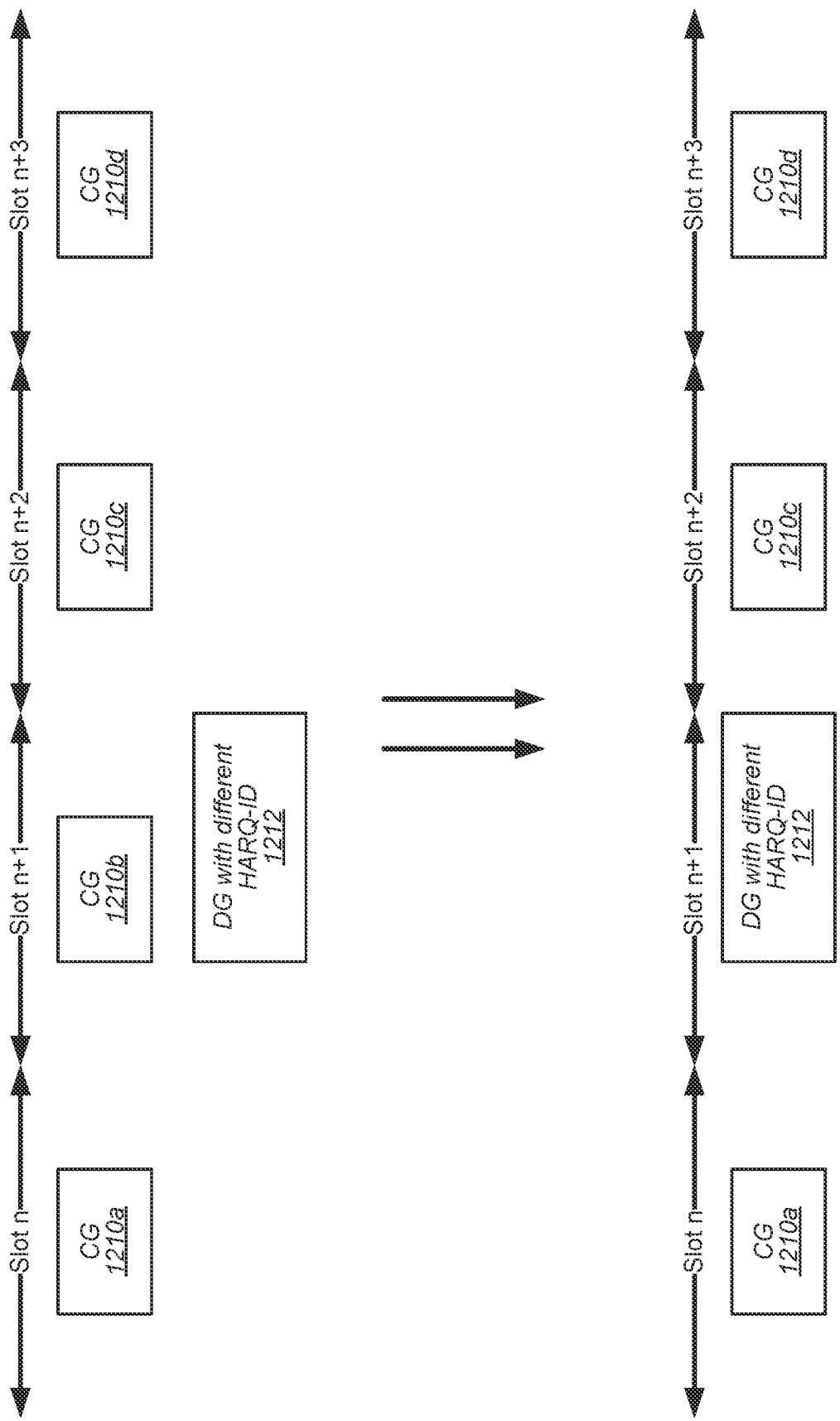
FIGS. 12A-C illustrate examples of implementations of configured grant/dynamic grant collision handling.
Figure 12B:
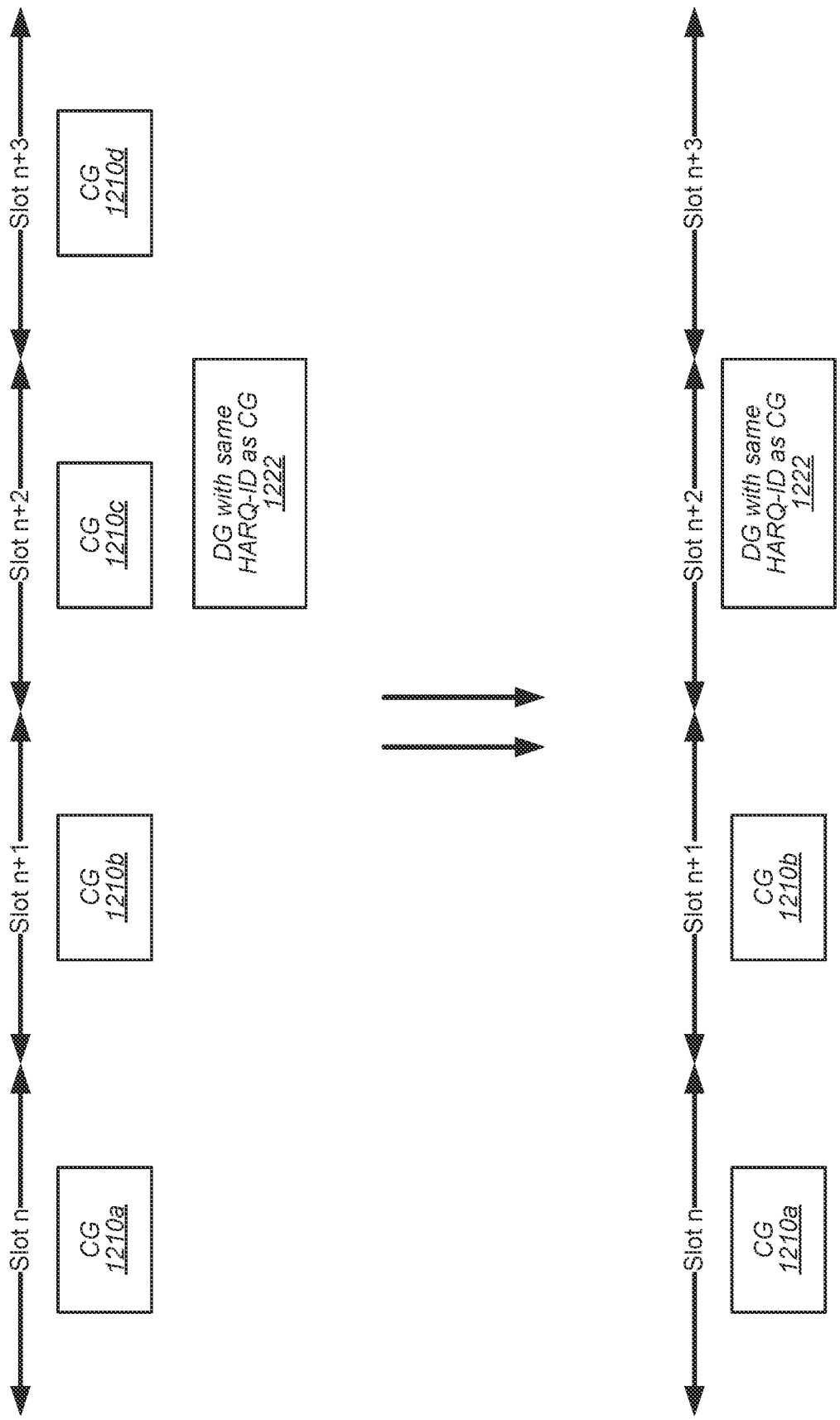
Figure 12C:
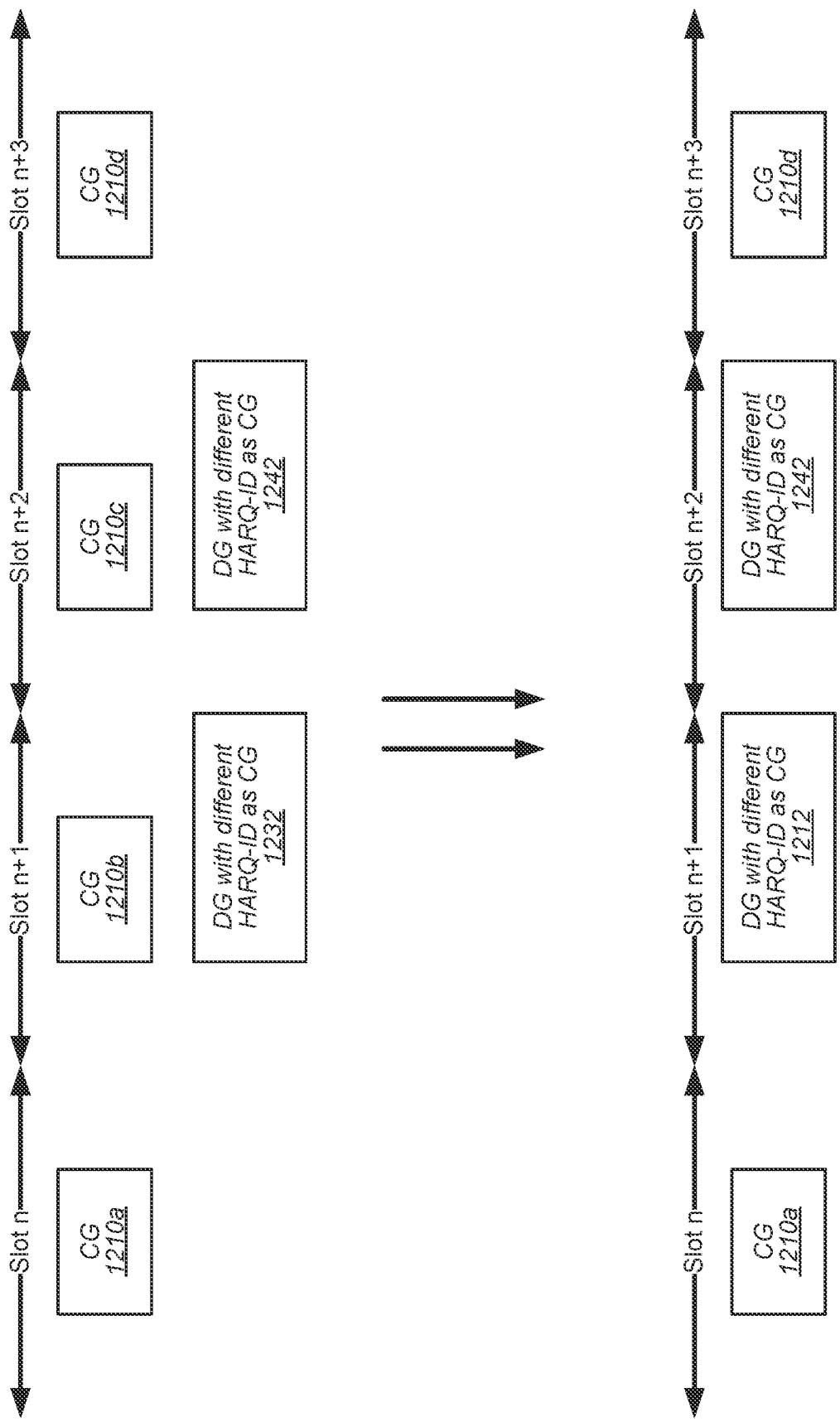

FIGS. 12A-C illustrate examples of implementations of configured grant/dynamic grant collision handling, according to the above conditions. For example, FIG. 12A illustrates an example of a configured grant, e.g., CG 1210*a-d*, scheduled across multiple slots, e.g., slots n to n+3, colliding with a dynamic grant with a different HARQ process ID, e.g., DG with different HARQ-ID 1212, as compared to the configured grant. As shown, based on the above conditions/rules, a UE will drop and/or override the transmission occasion corresponding to the dynamic grant (e.g., so the UE may transmit the dynamic grant) and transmit during the remaining configured grant transmission occasions. As another example, FIG. 12B illustrates an example of a configured grant, e.g., CG 1210*a-d*, scheduled across multiple slots, e.g., slots n to n+3, colliding with a dynamic grant with the same HARQ process ID, e.g., DG with same HARQ-ID 1222, as compared to the configured grant. As shown, based on the above conditions/rules, a UE will drop and/or override the transmission occasion corresponding to the dynamic grant (e.g., so the UE may transmit the dynamic grant) and any configured grants occurring after the dynamic grant and transmit during the remaining configured grant transmission occasions. As a further example, FIG. 12C illustrates an example of a configured grant, e.g., CG 1210*a-d*, scheduled across multiple slots, e.g., slots n to n+3, colliding with a dynamic grant with a different HARQ process ID, e.g., DG with different HARQ-ID 1212, as compared to the configured grant and also scheduled across multiple slots. As shown, based on the above conditions/rules, a UE will drop and/or override transmission occasions corresponding to the dynamic grant (e.g., so the UE may transmit the dynamic grant) and transmit during the remaining configured grant transmission occasions.

Given the above, 3GPP release 16 standardized enhancements such as introduction of PUSCH repetition type A and PUSCH repetition type B. According to PUSCH repetition type A, for a dynamic grant PUSCH, a repetition factor (which may be dynamically indicated by a base station), indicates a number of slots where PUSCH is transmitted. Note that the main difference between PUSCH repetition type A and PUSCH with slot aggregation, is how the aggregation factor or repetition factor is signaled; for PUSCH repetition type A, it is through dynamic signaling (e.g., an UL DCI), for PUSCH with slot aggregation, it is through RRC signaling. According to PUSCH repetition type B, a PUSCH transmission includes one or more nominal repetition and each nominal repetition can be segmented into zero, one or more actual repetition(s) if the nominal repetition would cross a slot boundary, thereby colliding with an OFDM symbol not for uplink transmission (e.g., from SFI or an invalid symbol pattern). Note that due to collision with symbol(s) not for uplink transmission and/or crossing a slot boundary, a nominal repetition may not lead to any actual repetition, e.g., the entire nominal repetition may be dropped. Note further that if a nominal repetition has more than one OFDM symbol, but an actual repetition resulted from the nominal repetition has a single OFDM symbol, the actual repetition of one symbol may be dropped. Additionally, PUSCH transmissions with repetition type B may be characterized by three parameters, including a starting symbol (S), a number of symbols in a nominal repetition (L), and a number of nominal repetitions in the PUSCH (K).

In addition to introducing PUSCH repetition types A and B, 3GPP release 16 introduced enhancements to configured grants. In particular, for an uplink bandwidth part at an uplink serving cell, up to 12 configured grant configurations can be configured ty the network, including both type 1 and type 2 configured grants. Thus, there may be 3 types of transmission schemes to consider, such as single slot transmission, multiple slot transmission, with either PUSCH slot aggregation or PUSCH repetition type A, and/or PUSCH repetition type B.

Further, 3GPP release 16 introduced a physical layer priority indication, e.g., to support multiplexing of UCI and PUSCH for different traffics, such as enhanced mobile broadband (eMBB), URLLC, and/or eURLLC. In particular, for PUSCH, a configured grant configuration may be RRC configured with a physical layer priority (low priority, high priority), hence a configured grant PUSCH transmission can be associated with a physical layer priority. Similarly, for dynamic grant PUSCH, a priority indicator field is introduced in DCI format 0_1 and UL DCI format (0_2), hence a dynamic grant PUSCH can be associated with a physical layer priority as well.

Additionally, as multiple configured grant configurations are supported on a bandwidth part (BWP) in 3GPP Release 16, it is not clear as to whether a later configured grant with the same physical layer priority is allowed to override an earlier configured grant. Further, assuming such a UE behavior is supported, base station blind detection could become onerously difficult and essentially the base station receiver would need to attempt decoding of each possible configured grant. Such a scheme would also be detrimental to system performance and may discourage network from utilizing configured grants, which in the end, hurts UE experience.

Figure 11:
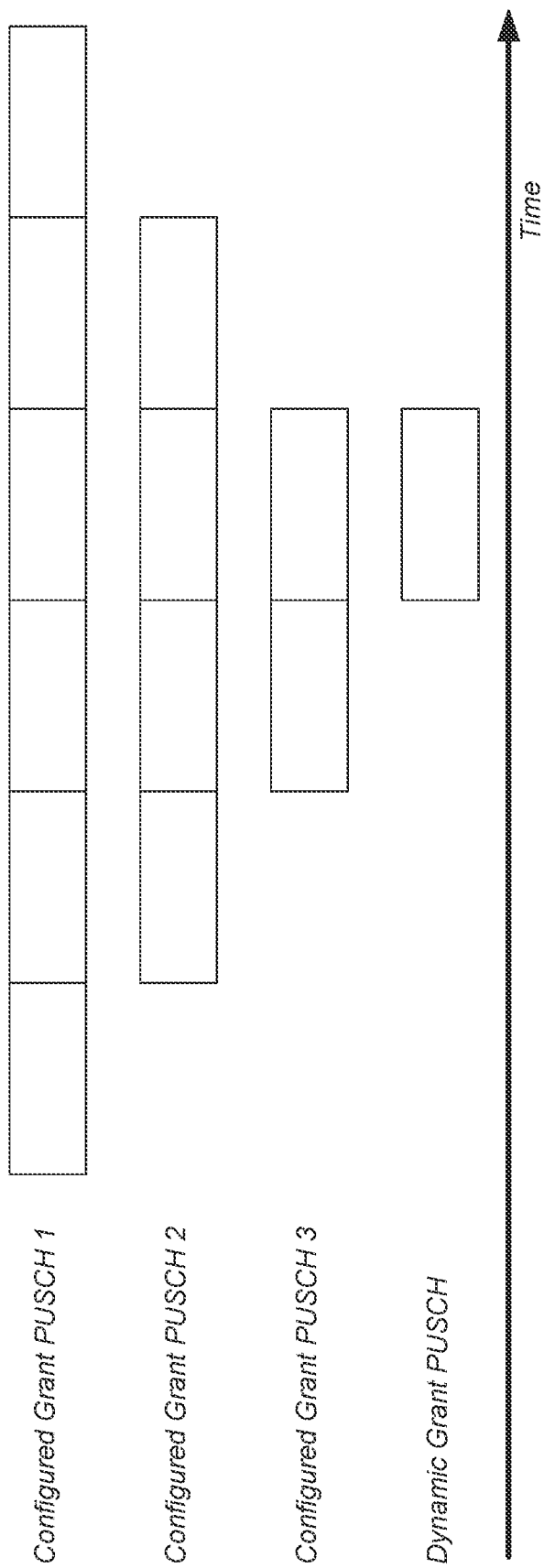
FIG. 11 illustrates an example of nested configured and dynamic grants.

In addition, due to support of multiple configured grants on a bandwidth part, nested transmissions may arise, e.g., as illustrated by FIG. 11. As shown, a UE may be configured with multiple configured grant PUSCHs as well as have a dynamic grant PUSCH. In such instances a UE may need to maintain multiple transport blocks in its layer 1 buffer and blind detection at the base station may onerously difficult.

These enhancements introduced in 3GPP release 16 may lead to different UE behavior than discussed above with regards to 3GPP release 15, e.g., based on PUSCH repetition A and PUSCH repetition type B, in instances of multiple configured grant configurations on a bandwidth part, and/or due to physical layer priority for PUSCH. In addition, with the introduction of physical layer priority for PUSCH, cancellation and replacement behavior has been pursued as a solution to handle URLLC traffic in the face of ongoing eMBB traffic in order to reduce scheduling/transmission latency. Additionally, given the introduction of PUSCH repetition type A and PUSCH repetition B, the above described conditions/rules associated with 3GPP release 15 behavior do not cover all aspects of the enhancements introduced in 3GPP release 16.

Embodiments described herein provide systems, methods, and mechanisms for cancellation and/or replacement of transmissions on physical uplink shared channels (PUSCHs) with differing priorities, e.g., for ultra-reliable low-latency communication (URLLC) and/or enhanced URLLC (eU-RLLC). In some embodiments, if (and/or when) a second PUSCH transmission does not share a HARQ process ID with a first PUSCH transmission (e.g., an existing PUSCH transmission), then any repetition with the first PUSCH transmission which overlaps with any portion of the second PUSCH transmission may be overridden. In some embodiments, if (and/or when) a second PUSCH transmission does not share a HARQ process ID with a first PUSCH transmission (e.g., an existing PUSCH transmission), then any repetition of the first PUSCH transmission between an earliest repetition of the first PUSCH transmission which overlaps (e.g., time overlaps and/or overlaps in time) with any portion of the second PUSCH transmission and a last repetition of the first PUSCH transmission which overlaps with any portion of the second PUSCH transmission may be overridden. In other words, in some embodiments, all repetitions (inclusive) between an earliest repetition and a latest repetition of a first PUSCH transmission which overlap with any portion of a second PUSCH transmission may be dropped and/or omitted. In some embodiments, if (and/or when) a second PUSCH transmission shares a HARQ process ID with a first PUSCH transmission (e.g., an existing PUSCH transmission), then any repetition of the first PUSCH transmission between an earliest repetition of the first PUSCH transmission which overlaps with any portion of the second PUSCH transmission and the last repetition of the first PUSCH transmission may be overridden.

For example, FIG. 13 illustrates examples of possible treatments of colliding transmissions, according to some embodiments. As shown, for scenarios in which a transmission associated with a configured grant PUSCH, configured as a single slot PUSCH, collides with a transmission associated with a dynamic grant PUSCH configured as a single slot PUSCH, a PUSCH with aggregation, and/or a PUSCH with repetition type A, a UE, such as UE 106, may follow 3GPP release 15 timing requirements and PUSCH repetition type A may follow PUSCH with aggregation treatment, e.g., as described above. Additionally, for scenarios in which a transmission associated with a configured grant PUSCH, configured as a PUSCH with repetition and/or a PUSCH with repetition type A, collides with a transmission associated with a dynamic grant PUSCH configured as a single slot PUSCH, a PUSCH with aggregation, and/or a PUSCH with repetition type A, a UE, such as UE 106, may follow 3GPP release 15 timing requirements and PUSCH repetition type A may follow PUSCH with aggregation treatment, e.g., as described above. In addition, for scenarios in which a transmission associated with a configured grant PUSCH, configured as a PUSCH with repetition type B, collides with a transmission associated with a dynamic grant PUSCH configured as a single slot PUSCH, a PUSCH with aggregation, and/or a PUSCH with repetition type A, a UE, such as UE 106, may follow 3GPP release 15 timing requirements and a transmission associated with a dynamic grant PUSCH that collides with any portion of a transmission associated with a configured grant PUSCH may override the transmission associated with the configured grant PUSCH, e.g., as further described herein with reference to FIGS. 14, 15, and 16. Further, for scenarios in which a transmission associated with a configured grant PUSCH collides with a transmission associated with a dynamic grant PUSCH configured with PUSCH repetition type B, any transmission of the dynamic grant PUSCH that overlaps a portion of a transmission associated with the configure grant PUSCH may override the transmission associated with the configured grant PUSCH, e.g., as further described herein with reference to FIGS. 14, 15, and 16.

In some embodiments, if (and/or when) all OFDM symbols in nominal repetitions of a dynamic grant PUSCH with repetition type B are used in the transmission, then the 3GPP release 15 overriding rules, as discussed above, may be used. In some embodiments, if (and/or when) a transmission associated with a single slot PUSCH overlaps with any nominal repetition of another PUSCH transmission configured with PUSCH repetition type B, those two PUSCHs are considered to be overlapping (e.g., overlapping in time and/or time overlapping). In some embodiments, if (and/or when) a transmission associated with a single slot PUSCH overlaps with at least one actual repetition of another PUSCH transmission configured with PUSCH repetition type B, those two PUSCHs are considered to be overlapping. For example, as illustrated by FIG. 14, if (and/or when) a single slot configured grant PUSCH overlaps with at least a portion of nominal repetitions of a dynamic grant PUSCH with repetition type B, but does not overlap with any actual repetitions of the dynamic grant PUSCH with repetition type B, then a UE, such as UE 106, may transmit on a configured grant within a single slot that does not overlap with an actual transmission of the dynamic grant PUSCH with repetition type B.

In some embodiments, if (and/or when) a transmission associated with a configured grant PUSCH with slot aggregation and/or PUSCH repetition type A overlaps with at least a portion of nominal repetitions of a dynamic grant PUSCH with repetition type B, but does not overlap with any actual repetitions of the dynamic grant PUSCH with repetition type B, then a UE, such as UE 106, may transmit on a configured grant PUSCH within a slot that does not overlap with an actual transmission of the dynamic grant PUSCH with repetition type B. Note that symbol j (e.g., as discussed above) may be with respect to a first slot within which a configured grant PUSCH transmission overlaps with a dynamic grant PUSCH transmission.

In some embodiments, if (and/or when) a transmission associated with a single slot dynamic grant PUSCH overlaps with at least a portion of nominal repetitions of a configured grant PUSCH with repetition type B, but does not overlap with any actual repetitions of the configured grant PUSCH with repetition type B, then a UE, such as UE 106, may transmit on the dynamic grant PUSCH within a slot that does not overlap with an actual transmission of the configured grant PUSCH with repetition type B. Note that symbol j (e.g., as discussed above) may be with respect to a first actual repetition among all the actual repetition of the configured grant PUSCH transmission which overlap with the dynamic grant PUSCH.

In some embodiments, if (and/or when) a transmission associated with a configured grant PUSCH with repetition type B overlaps with at least a portion of repetitions of a dynamic grant PUSCH with slot aggregation and/or PUSCH repetition type A, then a UE, such as UE 106, may transmit on a configured grant PUSCH within a slot that does not overlap with a transmission of the dynamic grant PUSCH with repetition type A, e.g., as illustrated by FIG. 15. As shown in FIG. 15, a configured grant PUSCH may configure the UE to transmit CG-1 and CG-2 in a first slot (e.g., slot n) and CG-3 and CG-4 in a second slot (e.g., slot n+1). Additionally, a dynamic grant PUCSH may configure the UE to transmit DG-1 in the first slot and DG-2 in the second slot. As shown, a UE, such as UE 106, supporting interlaced transmissions, may transmit CG-1 and DG-1 in the first slot and CG-3 and DG-2 in the second slot. Thus, where the configured grant and dynamic grant overlap, the UE may transmit the dynamic grant. Further, where the configured grant and dynamic grant do not overlap, the UE may transmit the configured grant. In other words, each actual repetition in the configured grant PUSCH is checked against each actual repetition in the dynamic grant PUSCH on a repetition-by-repetition basis.

In some embodiments, if (and/or when) a transmission associated with a configured grant PUSCH with repetition type B overlaps with at least a portion of repetitions of a dynamic grant PUSCH with slot aggregation and/or PUSCH repetition type A, then a UE, such as UE 106, may transmit on any configured grant PUSCH that occurs prior to a transmission of the dynamic grant PUSCH with repetition type A, e.g., as illustrated by FIG. 16. As shown in FIG. 16, a configured grant PUSCH may configure the UE to transmit CG-1 and CG-2 in a first slot (e.g., slot n) and CG-3 and CG-4 in a second slot (e.g., slot n+1). Additionally, a dynamic grant PUCSH may configure the UE to transmit DG-1 in the first slot and DG-2 in the second slot. As shown, a UE, such as UE 106, not supporting interlaced transmissions, may transmit CG-1 and DG-1 in the first slot and DG-2 in the second slot. Thus, where the configured grant and dynamic grant overlap, the UE may transmit the dynamic grant. Further, where the configured grant proceeds a first dynamic grant transmission, the UE may transmit the configured grant.

In some embodiments, if (and/or when) a transmission associated with a configured grant PUSCH with repetition type B overlaps with at least a portion of repetitions of a dynamic grant with PUSCH repetition type B, then a UE, such as UE 106, may transmit on a configured grant PUSCH within a slot that does not overlap with a transmission of the dynamic grant PUSCH with repetition type B. Thus, where the configured grant PUSCH and dynamic grant overlap PUSCH, the UE may transmit on the dynamic grant PUSCH. Further, where the configured grant PUSCH and dynamic grant PUSCH do not overlap, the UE may transmit on the configured grant PUSCH. In other words, each actual repetition in the configured grant PUSCH is checked against each actual repetition in the dynamic grant PUSCH on a repetition-by-repetition basis.

In some embodiments, if (and/or when) a transmission associated with a configured grant PUSCH with repetition type B overlaps with at least a portion of repetitions of a dynamic grant PUSCH with PUSCH repetition type B, then a UE, such as UE 106, may transmit on any configured grant PUSCH that occurs prior to a transmission of the dynamic grant PUSCH with repetition type B. Thus, where the configured grant PUSCH and dynamic grant PUSCH overlap, the UE may transmit on the dynamic grant PUSCH. Further, where the configured grant PUSCH proceeds a first dynamic grant PUSCH transmission, the UE may transmit on the configured grant PUSCH.

In some embodiments, a PUSCH may be designated at one of two priority levels. A first priority level may be associated with low priority and/or no priority (e.g., a PUSCH scheduled without a priority level, such as a PUSCH scheduled by DCI format 0_0, a configured grant PUSCH with a configured grant configuration not configured with a physical layer priority, and so forth). A second priority level may be associate with a high priority. In some embodiments, in instances where a configured grant has the first priority level, the above described 3GPP release 15 timeline for dynamic grants may be maintained with repetition by repetition overriding, e.g., to cover PUSCH repetition types A and B. Similarly, in some embodiments, in instances where a dynamic grant has the second priority level, the above described 3GPP release 15 timeline for dynamic grants may be maintained with repetition by repetition overriding, e.g., to cover PUSCH repetition types A and B. In some embodiments, a configured grant with the second priority level may override a priority dynamic grant with the first priority level. In some embodiments, such a rule (and/or condition) may be applied on a repetition by repetition basis, e.g., to cover PUSCH repetition types A and B.

In some embodiments, Section 6.1 of 3GPP TS 38.214 Release 16 version 2 may be modified to state that:
If a UE reports the capability of intra-UE prioritization, and if a PUSCH corresponding to a configured grant and a PUSCH scheduled by a PDCCH on a serving cell are partially or fully overlapping in time,
If the PUSCH corresponding to the configured grant has priority in configuredGrantConfig set to 1 (i.e., high priority), and the PUSCH scheduled by the PDCCH is indicated as low priority by having the priority indicator field in the scheduling DCI set to 0 or by not having the priority indicator field present in the scheduling DCI, the UE is expected to transmit the PUSCH corresponding to the configured grant, and drop the PUSCH transmission scheduled by the PDCCH from the first symbol of the repetition of the PUSCH transmission scheduled by the PDCCH which overlaps with repetition(s) of the PUSCH corresponding to the configured grant.
In case of PUSCH repetitions, the overlapping handling is performed for each PUSCH repetition separately.

The UE is not expected to be scheduled for another PUSCH by a PDCCH where this PUSCH starts no earlier than the end of the prioritized transmitted PUSCH and before the end of the time domain allocation of the cancelled PUSCH.

Further, in some embodiments, Section 6.1 of 3GPP TS 38.214 Release 16 version 2 may be modified to state that:
If a UE reports the capability of intra-UE prioritization, and if a PUSCH corresponding to a configured grant and a PUSCH scheduled by a PDCCH on a serving cell are partially or fully overlapping in time,
If the PUSCH corresponding to the configured grant has priority in configuredGrantConfig set to 1 (i.e., high priority), and the PUSCH scheduled by the PDCCH is indicated as low priority by having the priority indicator field in the scheduling DCI set to 0 or by not having the priority indicator field present in the scheduling DCI, the UE is expected to transmit the PUSCH corresponding to the configured grant, and drop the PUSCH transmission scheduled by the PDCCH from the first symbol of the repetition of the PUSCH transmission scheduled by the PDCCH which overlaps with repetition(s) of the PUSCH corresponding to the configured grant.
In case of PUSCH repetitions, the overlapping handling is performed for each PUSCH repetition separately if HPID of the PUSCH corresponding to the configured grant is different from the HPID of the PUSCH transmission scheduled by the PDCCH. If the HPID of the PUSCH corresponding to the configured grant is the same as the HPID of the PUSCH transmission scheduled by the PDCCH, the PUSCH transmission scheduled by the PDCCH from the first symbol of the repetition of the PUSCH transmission scheduled by the PDCCH which overlaps with repetition(s) of the PUSCH corresponding to the configured grant to the last symbol of the last repetition of the PUSCH transmission scheduled by the PDCCH is dropped.
The UE is not expected to be scheduled for another PUSCH by a PDCCH where this PUSCH starts no earlier than the end of the prioritized transmitted PUSCH and before the end of the time domain allocation of the cancelled PUSCH.]

In some embodiments, assuming a first configured grant PUSCH and a second configured grant PUSCH have the same physical layer priority, the second configured grant PUSCH may not be allowed to override the first configured grant PUSCH, where a transmission occasion for the first configured grant PUSCH occurs prior to a transmission occasion for the second configured grant PUSCH. Alternatively, in some embodiments, the second configured grant PUSCH may be allowed, in certain instances, to override the first configured grant PUSCH, where a transmission occasion for the first configured grant PUSCH occurs prior to a transmission occasion for the second configured grant PUSCH. For example, a UE, such as UE 106, may be prohibited from using the second configured grant PUSCH if (and/or when) a downlink HARQ process ID (HPID) would collide an HPID of the first configured grant PUSCH. As another example, a UE, such as UE 106, may use the second configured grant PUSCH if (and/or when) an HPID of the first configured grant PUSCH is the same as an HPID of the second configured grant PUSCH. In such embodiments, starting from a first repetition of the first configured grant PUSCH among repetitions of the first configured grant PUSCH overlapping with the second configured grant PUSCH, remaining repetitions of the first configured grant PUSCH may be dropped. As a further example, a UE, such as UE 106, may perform repetition by repetition overlap handling.

In some embodiments, assuming a first configured grant PUSCH and a second configured grant PUSCH have different physical layer priority, the first configured grant PUSCH may be allowed, in certain instances, to override the second configured grant PUSCH. For example, a UE, such as UE 106, may be prohibited from using a second configured grant PUSCH with the second priority level if (and/or when) an HPID of the second configured grant PUSCH would collide with an HPID of a first configured grant PUSCH with the first priority level. As another example, a UE, such as UE 106, may use a second configured grant PUSCH with the second priority level if (and/or when) an HPID of the second configured grant PUSCH is the same as an HPID of a first configured grant PUSCH with the first priority level. In such embodiments, starting from a first repetition of the first configured grant PUSCH among repetitions of the first configured grant PUSCH overlapping with the second configured grant PUSCH, remaining repetitions of the first configured grant PUSCH may be dropped. As a further example, a UE, such as UE 106, may perform repetition by repetition overlap handling.

Further, in some embodiments, Section 6.1 of 3GPP TS 38.214 Release 16 version 2 may be modified to state that:
- If a UE reports the capability of intra-UE prioritization, and if a second PUSCH corresponding to a configured grant and a first PUSCH corresponding to a configured grant on a serving cell are partially or fully overlapping in time,
  - If the second PUSCH corresponding to the configured grant has priority in configuredGrantConfig set to 1 (i.e., high priority), and the first PUSCH corresponding to the configured grant has priority in configuredGrantConfig set to 0 (i.e. low priority) or no priority configuration, the UE is expected to transmit the second PUSCH and drop the first PUSCH transmission from the first symbol of the repetition of the first PUSCH transmission which overlaps with repetition(s) of the second PUSCH.
- In case of PUSCH repetitions, the overlapping handling is performed for each PUSCH repetition separately if HPID of the second PUSCH is different from the HPID of the second PUSCH. If the HPID of the second PUSCH is the same as the HPID of the second PUSCH transmission, the first PUSCH transmission from the first symbol of the repetition of the first PUSCH which overlaps with repetition(s) of the second to the last symbol of the last repetition of the first PUSCH transmission is dropped.
- The UE is not expected to be scheduled for another PUSCH by a PDCCH where this PUSCH starts no earlier than the end of the prioritized transmitted PUSCH and before the end of the time domain allocation of the cancelled PUSCH.]

As discussed above, nested transmissions may become problematic for both a UE and a base station. Thus, in some embodiments, a number of nested levels may be limited to X, where X may be configured by either a UE, such as UE 106, e.g., based on UE capabilities, and/or via higher layer signaling (e.g., a UE may provide a base station with UE capabilities and the base station may determine a value of X, e.g., based on the UE capabilities and/or network traffic conditions). In some embodiments, up to X−1 levels of nested transmissions may be allowed for configured grant PUSCHs, e.g., such that one level remains for potential transmission for a dynamic grant PUSCH. In some embodiments, if (and/or when) in a radio system such as a radio system conforming to 3GPP release 17 in which high priority dynamic grant PUSCH may be allowed to override a low priority dynamic grant PUSCH, then X−2 levels may be allowed for configured grant PUSCHs, e.g., such that two levels are reserved for potential transmission(s) for a high priority dynamic grant PUSCH and/or a low priority dynamic grant PUSCH.

Figure 17:
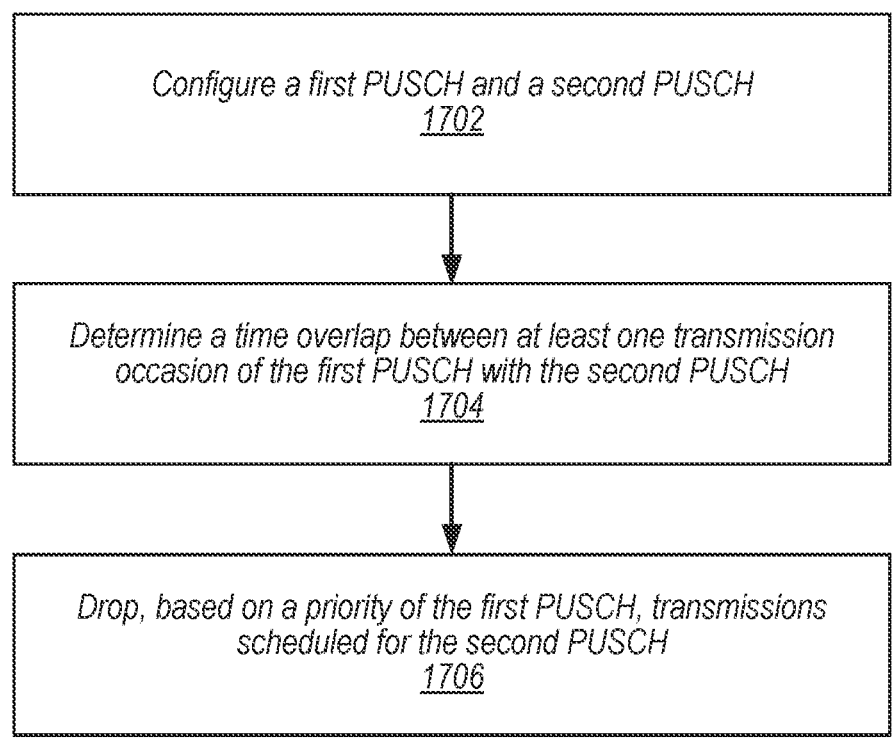
FIGS. 17-19 illustrate block diagrams of examples of methods for selection of physical uplink shared channels (PUSCHs) with differing priorities, according to some embodiments.

FIG. 17 illustrates a block diagram of an example of a method for selection of physical uplink shared channels (PUSCHs) with differing priorities, according to some embodiments. The method shown in FIG. 17 may be used in conjunction with any of the systems, methods, or devices shown in the Figures, among other devices. In various embodiments, some of the method elements shown may be performed concurrently, in a different order than shown, or may be omitted. Additional method elements may also be performed as desired. As shown, this method may operate as follows.

At 1702, a first PUSCH and a second PUSCH may be configured, e.g., by a UE, such as UE 106, e.g., the UE may determine resources for transmission on the first PUSCH and the second PUSCH. In some embodiments, the first PUSCH may correspond to a configured grant. In some embodiments, the second PUSCH may also correspond to a configured grant. In some embodiments, the second PUSCH may be scheduled by a physical downlink control channel (PDCCH) on a serving cell. Thus, the UE may configure the first PUSCH (e.g., determine resources for transmission on the first PUSCH) based on the configured grant. Similarly, the UE may configure the second PUSCH (e.g., determine resources for transmission on the second PUSCH) based on the schedule provided by the PDCCH on the serving cell and/or another configured grant. In other words, the UE may prepare transmission of first data on a first PUSCH resource based on the configured grant. Similarly, the UE may prepare transmission of second data on a second PUSCH resource based on the schedule provided by the PDCCH on the serving cell and/or another configured grant.

In some embodiments, the first PUSCH may be associated with a first priority level. Additionally, second PUSCH may be associated with a second priority level. In such embodiments, the first priority level may be associated with a high priority and the second priority level may be associated with one of low priority or no priority. In some embodiments, the first PUSCH may be one of a PUSCH with slot aggregation, a PUSCH with repetition type A, and/or a PUSCH with repetition type B. In some embodiments, the second PUSCH may be one of a PUSCH with slot aggregation, a PUSCH with repetition type A, or a PUSCH with repetition type B.

At 1704, the UE may determine a time overlap between at least one transmission occasion of the first PUSCH with the second PUSCH. In other words, the UE may determine that at least one transmission occasion associated with the first PUSCH overlaps in time (e.g., time overlaps) with at least one transmission occasion associated with the second PUSCH.

At 1706, the UE may drop, based, at least in part, on a priority of the first PUSCH, transmissions (e.g., one or more transmissions) scheduled for the second PUSCH. In some embodiments, the UE may determine that the priority of the first PUSCH is higher than a priority of the second PUSCH. In some embodiments, transmissions scheduled for the second PUSCH may be dropped starting with a first symbol of a repetition of the second PUSCH which overlaps in time with one or more repetitions of the first PUSCH. In some embodiments, for each respective repetition of the second PUSCH, transmissions scheduled for the second PUSCH may be dropped starting with a first symbol of the respective repetition of the second PUSCH which overlaps in time with one or more repetitions of the first PUSCH.

In some embodiments, dropping transmissions scheduled for the second PUSCH may include the UE determining whether a downlink hybrid automatic repeat request (HARD) process identifier (HPID) of the first PUSCH is different from an HPID of the second PUSCH. In such embodiments, in response to determining that the HPID of the first PUSCH is different from the HPDI of the second PUSCH, the UE may drop, for each respective repetition of the second PUSCH, transmissions scheduled for the second PUSCH starting with a first symbol of the respective repetition of the second PUSCH which overlaps in time with one or more repetitions of the first PUSCH. Additionally, in such embodiments, in response to determining that the HPID of the first PUSCH is not different from the HPDI of the second PUSCH, the UE may drop transmissions scheduled for the second PUSCH from a first symbol of a repetition of the second PUSCH which overlaps in time with one or more repetition of the first PUSCH to a last symbol of a last repetition of the second PUSCH.

In some embodiments, the UE may transmit at least a portion of transmissions scheduled for the second PUSCH that do not time overlap with transmissions scheduled for the first PUSCH. In some embodiments, the UE may skip at least a portion of transmissions scheduled for the second PUSCH that do not time overlap with transmissions scheduled for the first PUSCH.

Figure 18:
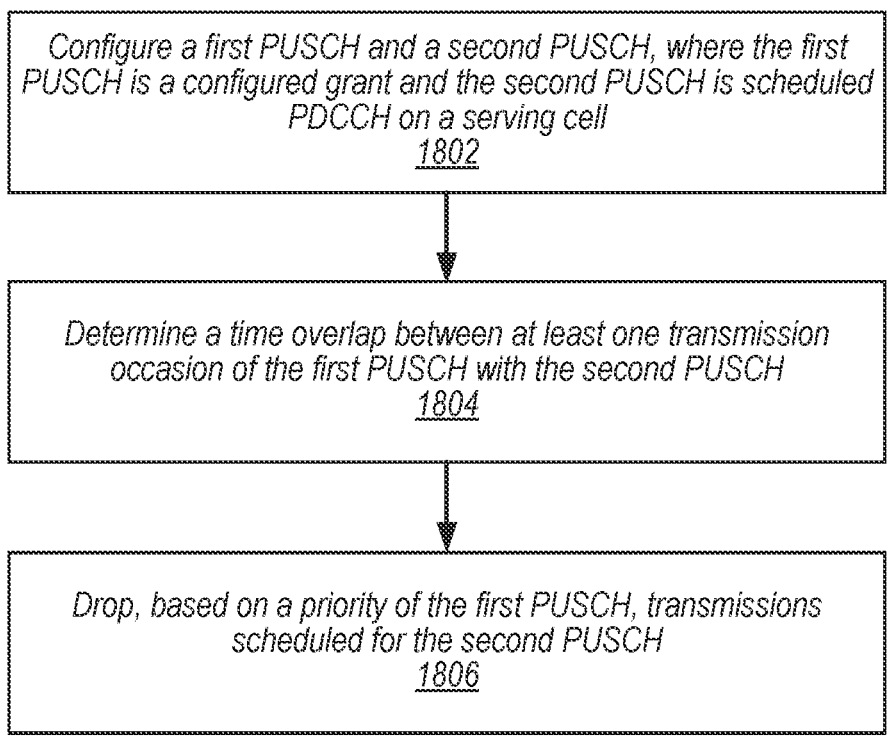

FIG. 18 illustrates another block diagram of an example of a method for selection of physical uplink shared channels (PUSCHs) with differing priorities, according to some embodiments. The method shown in FIG. 18 may be used in conjunction with any of the systems, methods, or devices shown in the Figures, among other devices. In various embodiments, some of the method elements shown may be performed concurrently, in a different order than shown, or may be omitted. Additional method elements may also be performed as desired. As shown, this method may operate as follows.

At 1802, a first PUSCH and a second PUSCH may be configured, e.g., by a UE, such as UE 106, e.g., the UE may determine resources for transmission on the first PUSCH and the second PUSCH. In some embodiments, the first PUSCH may correspond to a configured grant and the second PUSCH may be scheduled by a physical downlink control channel (PDCCH) on a serving cell. Thus, the UE may configure the first PUSCH (e.g., determine resources for transmission on the first PUSCH) based on the configured grant. Similarly, the UE may configure the second PUSCH (e.g., determine resources for transmission on the second PUSCH) based on the schedule provided by the PDCCH on the serving cell. In other words, the UE may prepare transmission of first data on a first PUSCH resource based on the configured grant. Similarly, the UE may prepare transmission of second data on a second PUSCH resource based on the schedule provided by the PDCCH on the serving cell.

In some embodiments, the first PUSCH may be associated with a first priority level. Additionally, the second PUSCH may be associated with a second priority level. In such embodiments, the first priority level may be associated with a high priority and the second priority level may be associated with one of low priority or no priority. In some embodiments, the first PUSCH may be one of a PUSCH with slot aggregation, a PUSCH with repetition type A, and/or a PUSCH with repetition type B. In some embodiments, the second PUSCH may be one of a PUSCH with slot aggregation, a PUSCH with repetition type A, or a PUSCH with repetition type B.

At 1804, the UE may determine a time overlap between at least one transmission occasion of the first PUSCH with the second PUSCH. In other words, the UE may determine that at least one transmission occasion associated with the first PUSCH overlaps in time (e.g., time overlaps) with at least one transmission occasion associated with the second PUSCH.

At 1806, the UE may drop, based, at least in part, on a priority of the first PUSCH, transmissions (e.g., one or more transmissions) scheduled for the second PUSCH. In some embodiments, the UE may determine that the priority of the first PUSCH is higher than a priority of the second PUSCH. In some embodiments, transmissions scheduled for the second PUSCH may be dropped starting with a first symbol of a repetition of the second PUSCH which overlaps in time with one or more repetitions of the first PUSCH. In some embodiments, for each respective repetition of the second PUSCH, transmissions scheduled for the second PUSCH may be dropped starting with a first symbol of the respective repetition of the second PUSCH which overlaps in time with one or more repetitions of the first PUSCH.

In some embodiments, dropping transmissions scheduled for the second PUSCH may include the UE determining whether a downlink hybrid automatic repeat request (HARQ) process identifier (HPID) of the first PUSCH is different from an HPID of the second PUSCH. In such embodiments, in response to determining that the HPID of the first PUSCH is different from the HPDI of the second PUSCH, the UE may drop, for each respective repetition of the second PUSCH, transmissions scheduled for the second PUSCH starting with a first symbol of the respective repetition of the second PUSCH which overlaps in time with one or more repetitions of the first PUSCH. Additionally, in such embodiments, in response to determining that the HPID of the first PUSCH is not different from the HPDI of the second PUSCH, the UE may drop transmissions scheduled for the second PUSCH from a first symbol of a repetition of the second PUSCH which overlaps in time with one or more repetition of the first PUSCH to a last symbol of a last repetition of the second PUSCH.

In some embodiments, the UE may transmit at least a portion of transmissions scheduled for the second PUSCH that do not time overlap with transmissions scheduled for the first PUSCH. In some embodiments, the UE may skip at least a portion of transmissions scheduled for the second PUSCH that do not time overlap with transmissions scheduled for the first PUSCH.

Figure 19:
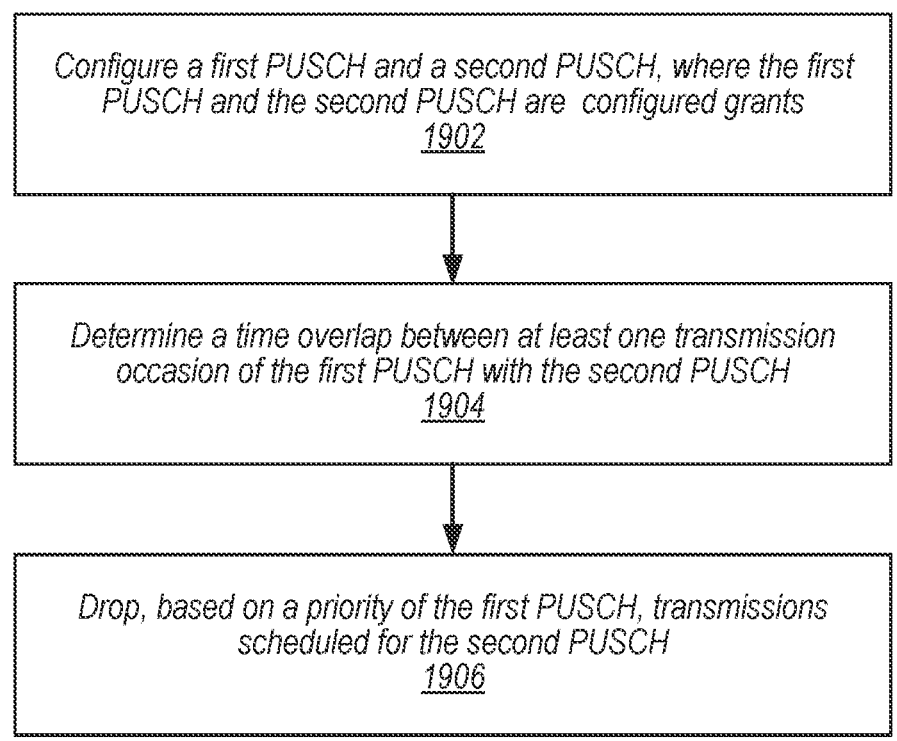

FIG. 19 illustrates yet another block diagram of an example of a method for selection of physical uplink shared channels (PUSCHs) with differing priorities, according to some embodiments. The method shown in FIG. 19 may be used in conjunction with any of the systems, methods, or devices shown in the Figures, among other devices. In various embodiments, some of the method elements shown may be performed concurrently, in a different order than shown, or may be omitted. Additional method elements may also be performed as desired. As shown, this method may operate as follows.

At 1902, a first PUSCH and a second PUSCH may be configured, e.g., by a UE, such as UE 106. In some embodiments, the first PUSCH may correspond to a first configured grant and the second PUSCH may correspond to a second configured grant. Thus, the UE may configure the first PUSCH (e.g., determine resources for transmission on the first PUSCH) based on the first configured grant. Similarly, the UE may configure the second PUSCH (e.g., determine resources for transmission on the second PUSCH) based on the second configured grant. In other words, the UE may prepare transmission of first data on a first PUSCH resource based on the first configured grant. Similarly, the UE may prepare transmission of second data on a second PUSCH resource based on the second configured grant.

In some embodiments, the first PUSCH may be associated with a first priority level. Additionally, second PUSCH may be associated with a second priority level. In such embodiments, the first priority level may be associated with a high priority and the second priority level may be associated with one of low priority or no priority. In some embodiments, the first PUSCH may be one of a PUSCH with slot aggregation, a PUSCH with repetition type A, and/or a PUSCH with repetition type B. In some embodiments, the second PUSCH may be one of a PUSCH with slot aggregation, a PUSCH with repetition type A, or a PUSCH with repetition type B.

At 1904, the UE may determine a time overlap between at least one transmission occasion of the first PUSCH with the second PUSCH. In other words, the UE may determine that at least one transmission occasion associated with the first PUSCH overlaps in time (e.g., time overlaps) with at least one transmission occasion associated with the second PUSCH.

At 1906, the UE may drop, based, at least in part, on a priority of the first PUSCH, transmissions (e.g., one or more transmissions) scheduled for the second PUSCH. In some embodiments, the UE may determine that the priority of the first PUSCH is higher than a priority of the second PUSCH. In some embodiments, transmissions scheduled for the second PUSCH may be dropped starting with a first symbol of a repetition of the second PUSCH which overlaps in time with one or more repetitions of the first PUSCH. In some embodiments, for each respective repetition of the second PUSCH, transmissions scheduled for the second PUSCH may be dropped starting with a first symbol of the respective repetition of the second PUSCH which overlaps in time with one or more repetitions of the first PUSCH.

In some embodiments, dropping transmissions scheduled for the second PUSCH may include the UE determining whether a downlink hybrid automatic repeat request (HARQ) process identifier (HPID) of the first PUSCH is different from an HPID of the second PUSCH. In such embodiments, in response to determining that the HPID of the first PUSCH is different from the HPDI of the second PUSCH, the UE may drop, for each respective repetition of the second PUSCH, transmissions scheduled for the second PUSCH starting with a first symbol of the respective repetition of the second PUSCH which overlaps in time with one or more repetitions of the first PUSCH. Additionally, in such embodiments, in response to determining that the HPID of the first PUSCH is not different from the HPDI of the second PUSCH, the UE may drop transmissions scheduled for the second PUSCH from a first symbol of a repetition of the second PUSCH which overlaps in time with one or more repetition of the first PUSCH to a last symbol of a last repetition of the second PUSCH.

In some embodiments, the UE may transmit at least a portion of transmissions scheduled for the second PUSCH that do not time overlap with transmissions scheduled for the first PUSCH. In some embodiments, the UE may skip at least a portion of transmissions scheduled for the second PUSCH that do not time overlap with transmissions scheduled for the first PUSCH.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

Embodiments of the present disclosure may be realized in any of various forms. For example, some embodiments may be realized as a computer-implemented method, a computer-readable memory medium, or a computer system. Other embodiments may be realized using one or more custom-designed hardware devices such as ASICs. Still other embodiments may be realized using one or more programmable hardware elements such as FPGAs.

In some embodiments, a non-transitory computer-readable memory medium may be configured so that it stores program instructions and/or data, where the program instructions, if executed by a computer system, cause the computer system to perform a method, e.g., any of the method embodiments described herein, or, any combination of the method embodiments described herein, or, any subset of any of the method embodiments described herein, or, any combination of such subsets.

In some embodiments, a device (e.g., a UE 106) may be configured to include a processor (or a set of processors) and a memory medium, where the memory medium stores program instructions, where the processor is configured to read and execute the program instructions from the memory medium, where the program instructions are executable to implement any of the various method embodiments described herein (or, any combination of the method embodiments described herein, or, any subset of any of the method embodiments described herein, or, any combination of such subsets). The device may be realized in any of various forms.

Any of the methods described herein for operating a user equipment (UE) may be the basis of a corresponding method for operating a base station, by interpreting each message/signal X received by the UE in the downlink as message/signal X transmitted by the base station, and each message/signal Y transmitted in the uplink by the UE as a message/signal Y received by the base station.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A method for selection of physical uplink shared channels (PUSCHs), comprising:
    determining that at least a first transmission corresponding to a first PUSCH associated with a configured grant would overlap in time with at least a second transmission corresponding to a second PUSCH scheduled by downlink control information (DCI);
    determining a hybrid automatic repeat request (HARQ) process identifier (HPID) of the first PUSCH is different from an HPID of the second PUSCH;
    determining a priority of the first PUSCH is higher than a priority of the second PUSCH; and selectively dropping transmission repetitions scheduled for the first PUSCH or transmission repetitions scheduled for the second PUSCH starting with a symbol at which a transmission repetition begins to overlap with transmissions of the other PUSCH.

2. The method of claim 1,
wherein selectively dropped dropping transmission repetitions scheduled for the first PUSCH or transmission repetitions scheduled for the second PUSCH starting with the symbol at which the transmission repetition begins to overlap with transmissions of the other PUSCH comprises dropping transmission repetitions scheduled for the second PUSCH starting with a first symbol of a respective repetition of the second PUSCH which overlaps in time with one or more transmissions of the first PUSCH.

3. The method of claim 2, further comprising:
transmitting at least a portion of transmissions scheduled for the second PUSCH that do not time overlap with transmissions scheduled for the first PUSCH.

4. The method of claim 2, further comprising:
skipping at least a portion of transmissions scheduled for the second PUSCH that do not time overlap with transmissions scheduled for the first PUSCH.

5. The method of claim 1, further comprising:
determining that the HPID of the first PUSCH is not different from the HPID of the second PUSCH; and
dropping transmission repetitions for the first PUSCH starting from a first symbol of a repetition of the first PUSCH which overlaps in time with one or more transmissions of the second PUSCH.

6. The method of claim 1, further comprising:
configuring the first PUSCH and the second PUSCH.

7. The method of claim 1,
wherein the first PUSCH is one of a PUSCH with slot aggregation, a PUSCH with repetition type A, or a PUSCH with repetition type B.

8. The method of claim 1,
wherein the second PUSCH is one of a PUSCH with slot aggregation, a PUSCH with repetition type A, or a PUSCH with repetition type B.

9. An apparatus, comprising:
a memory; and
a processing element in communication with the memory, wherein the processing element is configured to:
determine that at least a first transmission corresponding to a first PUSCH associated with a configured grant would overlap in time with at least a second transmission corresponding to a second PUSCH scheduled by downlink control information (DCI);
determine a hybrid automatic repeat request (HARQ) process identifier (HPID) of the first PUSCH is different from an HPID of the second PUSCH;
determine a priority of the first PUSCH is higher than a priority of the second PUSCH; and
selectively drop transmission repetitions scheduled for the first PUSCH or transmission repetitions scheduled for the second PUSCH starting with a symbol at which a transmission repetition begins to overlap with transmissions of the other PUSCH.

10. The apparatus of claim 9,
wherein, to selectively drop transmission repetitions scheduled for the first PUSCH or transmission repetitions scheduled for the second PUSCH starting with the symbol at which the transmission repetition begins to overlap with transmissions of the other PUSCH, the processing element is further configured to drop transmission repetitions scheduled for the second PUSCH starting with a first symbol of a respective repetition of the second PUSCH which overlaps in time with one or more transmissions of the first PUSCH.

11. The apparatus of claim 10,
wherein the processing element is further configured to:
transmit at least a portion of transmissions scheduled for the second PUSCH that do not time overlap with transmissions scheduled for the first PUSCH.

12. The apparatus of claim 10,
wherein the processing element is further configured to:
skip at least a portion of transmissions scheduled for the second PUSCH that do not time overlap with transmissions scheduled for the first PUSCH.

13. The apparatus of claim 9,
wherein the processing element is further configured to:
determine that the HPID of the first PUSCH is not different from the HPID of the second PUSCH; and
drop transmission repetitions for the first PUSCH starting from a first symbol of a repetition of the first PUSCH which overlaps in time with one or more transmissions of the second PUSCH.

14. The apparatus of claim 9,
wherein the processing element is further configured to:
configure the first PUSCH and the second PUSCH.

15. A user equipment device (UE), comprising:
at least one antenna;
at least one radio, wherein the at least one radio is configured to perform cellular communication using at least one radio access technology (RAT); and
one or more processors coupled to the at least one radio, wherein the one or more processors and the at least one radio are configured to perform voice and/or data communications;
wherein the one or more processors are configured to cause the UE to:
determine that at least a first transmission corresponding to a first PUSCH associated with a configured grant would overlap in time with at least a second transmission corresponding to a second PUSCH scheduled by downlink control information (DCI); and
determine a hybrid automatic repeat request (HARQ) process identifier (HPID) of the first PUSCH is different from an HPID of the second PUSCH;
determine a priority of the first PUSCH is higher than a priority of the second PUSCH; and
selectively drop transmission repetitions scheduled for the first PUSCH or transmission repetitions scheduled for the second PUSCH starting with a symbol at which a transmission repetition begins to overlap with transmissions of the other PUSCH.

16. The UE of claim 15,
wherein, to selectively drop transmission repetitions scheduled for the first PUSCH or transmission repetitions scheduled for the second PUSCH starting with the symbol at which the transmission repetition begins to overlap with transmissions of the other PUSCH, the one or more processors are further configured to cause the UE to drop transmission repetitions scheduled for the second PUSCH starting with a first symbol of a respective repetition of the second PUSCH which overlaps in time with one or more transmissions of the first PUSCH.

17. The UE of claim 16,
wherein the one or more processors are further configured to cause the UE to:

transmit at least a portion of transmissions scheduled for the second PUSCH that do not time overlap with transmissions scheduled for the first PUSCH.

18. The UE of claim 16, wherein the one or more processors are further configured to cause the UE to:
skip at least a portion of transmissions scheduled for the second PUSCH that do not time overlap with transmissions scheduled for the first PUSCH.

19. The UE of claim 15, wherein the one or more processors are further configured to cause the UE to:
determine that the HPID of the first PUSCH is not different from the HPID of the second PUSCH; and
drop transmission repetitions for the first PUSCH starting from a first symbol of a repetition of the first PUSCH which overlaps in time with one or more transmissions of the second PUSCH.

20. The UE of claim 15, wherein one or more processors are further configured to cause the UE to:
configure the first PUSCH and the second PUSCH.

* * * * *

UNITED STATES PATENT AND TRADEMARK OFFICE
CERTIFICATE OF CORRECTION

PATENT NO. : 12,363,705 B2
APPLICATION NO. : 18/487691
DATED : July 15, 2025
INVENTOR(S) : Weidong Yang et al.

Page 1 of 1

It is certified that error appears in the above-identified patent and that said Letters Patent is hereby corrected as shown below:

In the Claims

Column 37, Line 7, delete "dropped"

Signed and Sealed this
Ninth Day of September, 2025

Coke Morgan Stewart
*Acting Director of the United States Patent and Trademark Office*